(12) United States Patent
Yabe

(10) Patent No.: US 9,065,828 B2
(45) Date of Patent: Jun. 23, 2015

(54) SYSTEM FOR DELEGATION OF AUTHORITY, ACCESS MANAGEMENT SERVICE SYSTEM, MEDIUM, AND METHOD FOR CONTROLLING THE SYSTEM FOR DELEGATION OF AUTHORITY

(71) Applicant: Canon Kabushiki Kaisha, Tokyo (JP)

(72) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 13/738,477

(22) Filed: Jan. 10, 2013

(65) Prior Publication Data

US 2013/0185809 A1    Jul. 18, 2013

(30) Foreign Application Priority Data

Jan. 16, 2012   (JP) .................................. 2012-006205

(51) Int. Cl.
*H04N 7/16* (2011.01)
*H04L 29/06* (2006.01)

(52) U.S. Cl.
CPC ...................................... *H04L 63/10* (2013.01)

(58) Field of Classification Search
CPC .................. H04L 63/0884; G06F 2221/2141; G06F 2221/2115
See application file for complete search history.

(56) References Cited

U.S. PATENT DOCUMENTS

| 7,966,652 B2* | 6/2011 | Ganesan | 726/4 |
| 2008/0072301 A1* | 3/2008 | Chia et al. | 726/8 |
| 2009/0254978 A1* | 10/2009 | Rouskov et al. | 726/4 |
| 2011/0321129 A1* | 12/2011 | Kinsel et al. | 726/4 |

FOREIGN PATENT DOCUMENTS

JP   2004-252955 A   9/2004

* cited by examiner

*Primary Examiner* — Nirav B Patel
*Assistant Examiner* — Mohammed Waliullah
(74) *Attorney, Agent, or Firm* — Canon U.S.A., Inc. IP Division

(57) ABSTRACT

In sequential processing including issuance of an approval token from a user to a cooperation source service via an access management service, a system for delegation of authority confirms whether each of the user and the cooperation source service has a sufficient authority to execute a service of a cooperation destination before issuing the approval token.

9 Claims, 20 Drawing Sheets

FIG.4

SERVICE COOPERATION TABLE (400)

| SERVICE NAME (401) | API (402) | SCOPE ID (403) |
|---|---|---|
| BUSINESS FORM SERVICE | http://form_service/xxx | Scope_FormUser,Scope_FormInvoker |
| PRINT SERVICE | http://print_service/yyy | Scope_PrintUser,Scope_PrintInvoker |

APPROVAL CODE TABLE (410)

| SERVICE NAME (411) | APPROVAL CODE ID (412) |
|---|---|
| BUSINESS FORM SERVICE | ABCD1234 |
| PRINT SERVICE | ZXCV5678 |

APPROVAL TOKEN TABLE (420)

| SERVICE NAME (421) | TOKEN ID (422) |
|---|---|
| BUSINESS FORM SERVICE | EFGH5678 |
| PRINT SERVICE |  |

FIG.8

| USER TABLE | |
|---|---|
| USER ID | PASSWORD |
| User1 | ******** |
| User2 | ****** |
| INVOKER | ********* |
| .... | .... |

FIG.9

ROLE TABLE (910)

| ROLE ID (911) | ROLE NAME |
|---|---|
| UserRole_Form | BUSINESS FORM USER |
| UserRole_Print | PRINT USER |
| ServiceRole_Form | BUSINESS FORM COOPERATION SERVICE |
| ServiceRole_Print | PRINT COOPERATION SERVICE |
| ... | ... |

USER ALLOCATION ROLE TABLE (920)

| USER ID (921) | ROLE ID (922) |
|---|---|
| User1 | UserRole_Form |
| User1 | UserRole_Print |
| User2 | UserRole_Form |
| INVOKER | ServiceRole_Form |
| INVOKER | ServiceRole_Print |
| ... | ... |

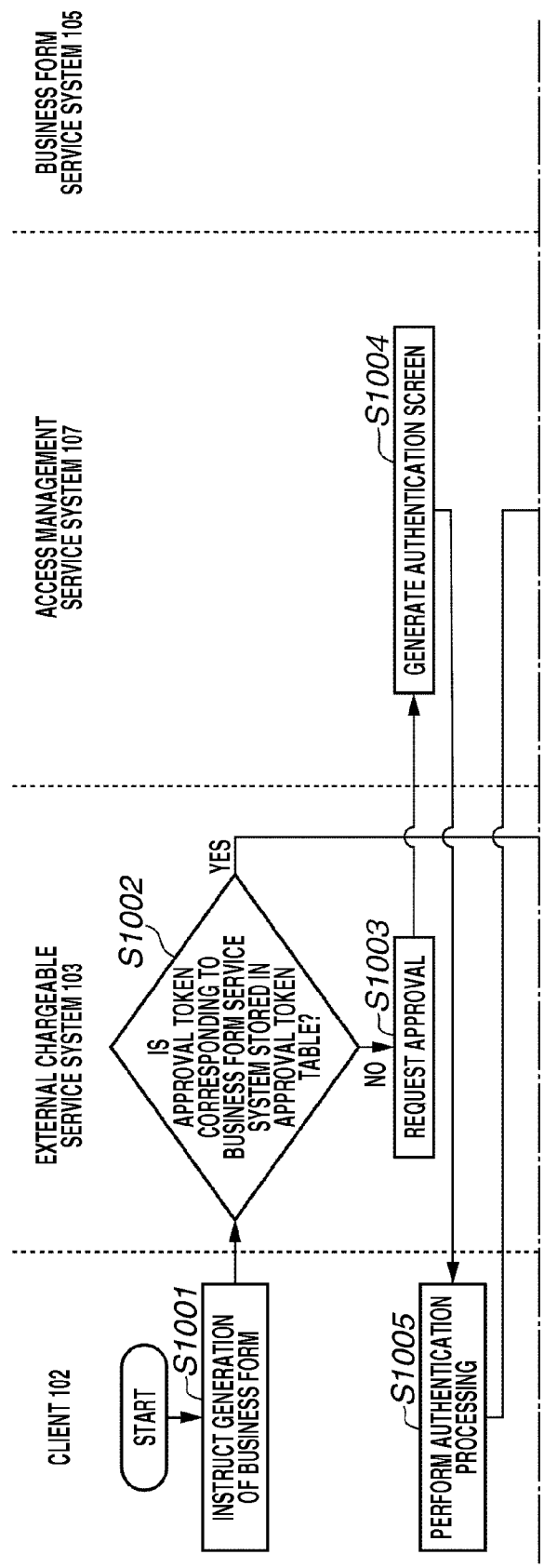

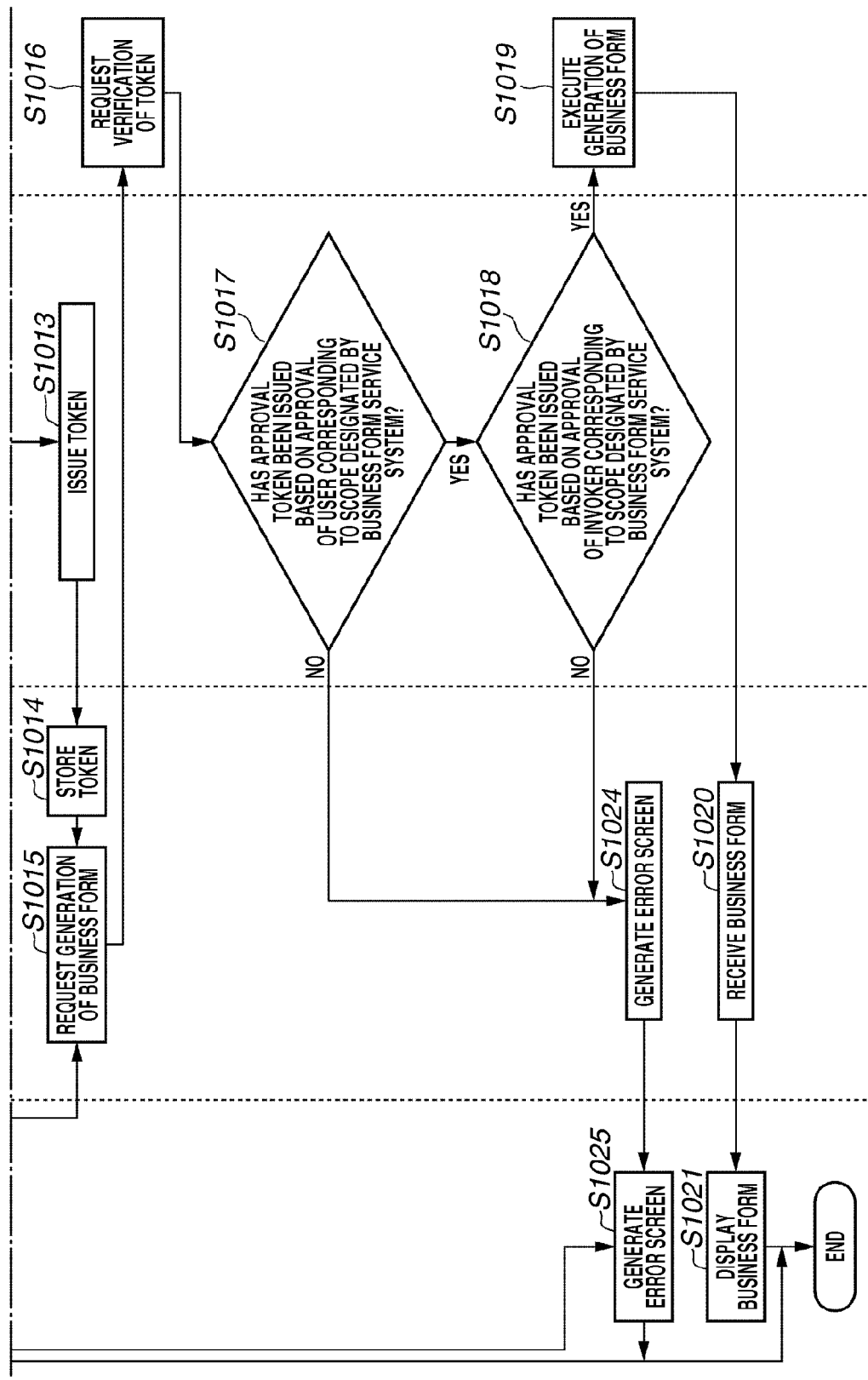

| SCOPE TABLE | |
|---|---|
| SCOPE ID — 1101 | ROLE ID — 1102 |
| Scope_FormUser | UserRole_Form |
| Scope_PrintUser | UserRole_Print |
| Scope_FormInvoker | ServiceRole_Form |
| Scope_PrintInvoker | ServiceRole_Print |

FIG.13

| APPROVAL CODE TABLE {1300} | | |
|---|---|---|
| APPROVAL CODE ID {1301} | USER ID {1302} | SCOPE ID {1303} |
| ABCD1234 | User1 | Scope_FormUser,Scope_FormInvoker |
| ZXCV5678 | User1 | Scope_FormUser,Scope_FormInvoker Scope_PrintUser,Scope_PrintInvoker |

FIG.14

APPROVAL TOKEN TABLE 1400

| TOKEN ID 1401 | USER ID 1402 | INVOKER ID 1403 | SCOPE ID 1404 |
|---|---|---|---|
| EFGH5678 | User1 | INVOKER | Scope_FormUser,Scope_FormInvoker |

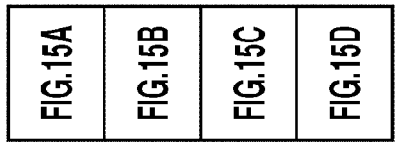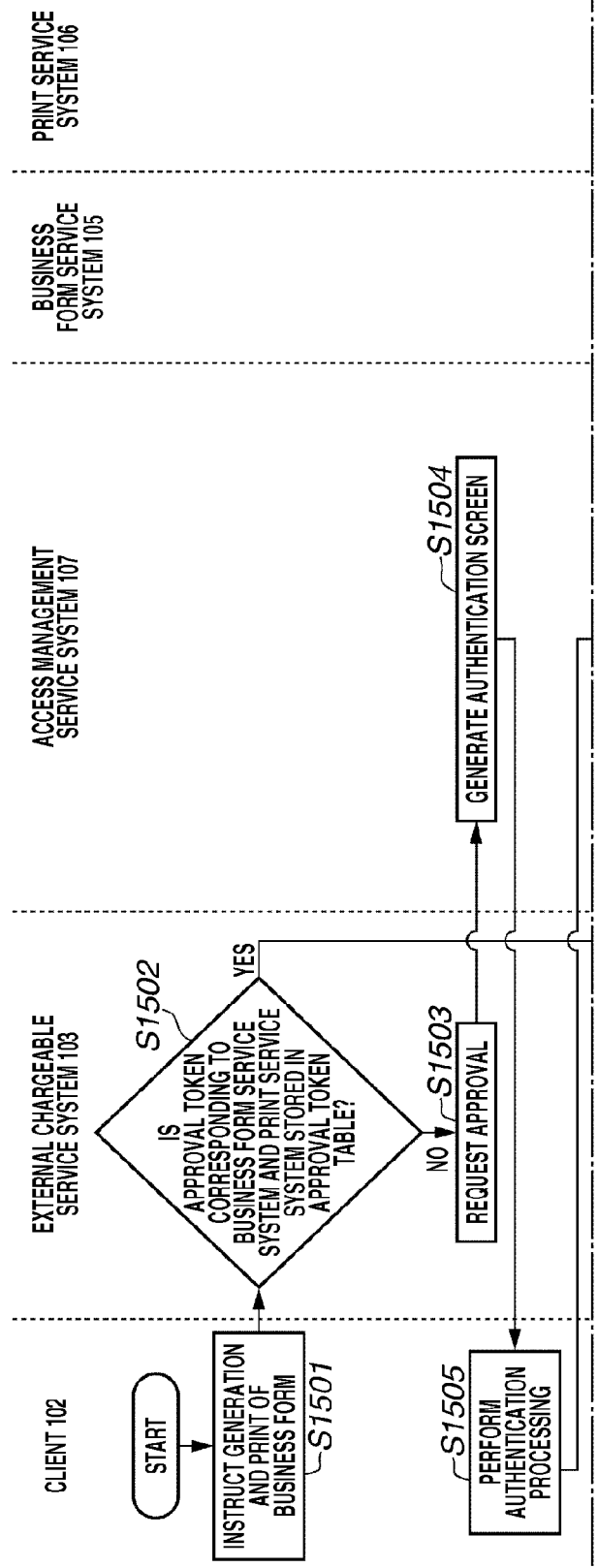
FIG.15A

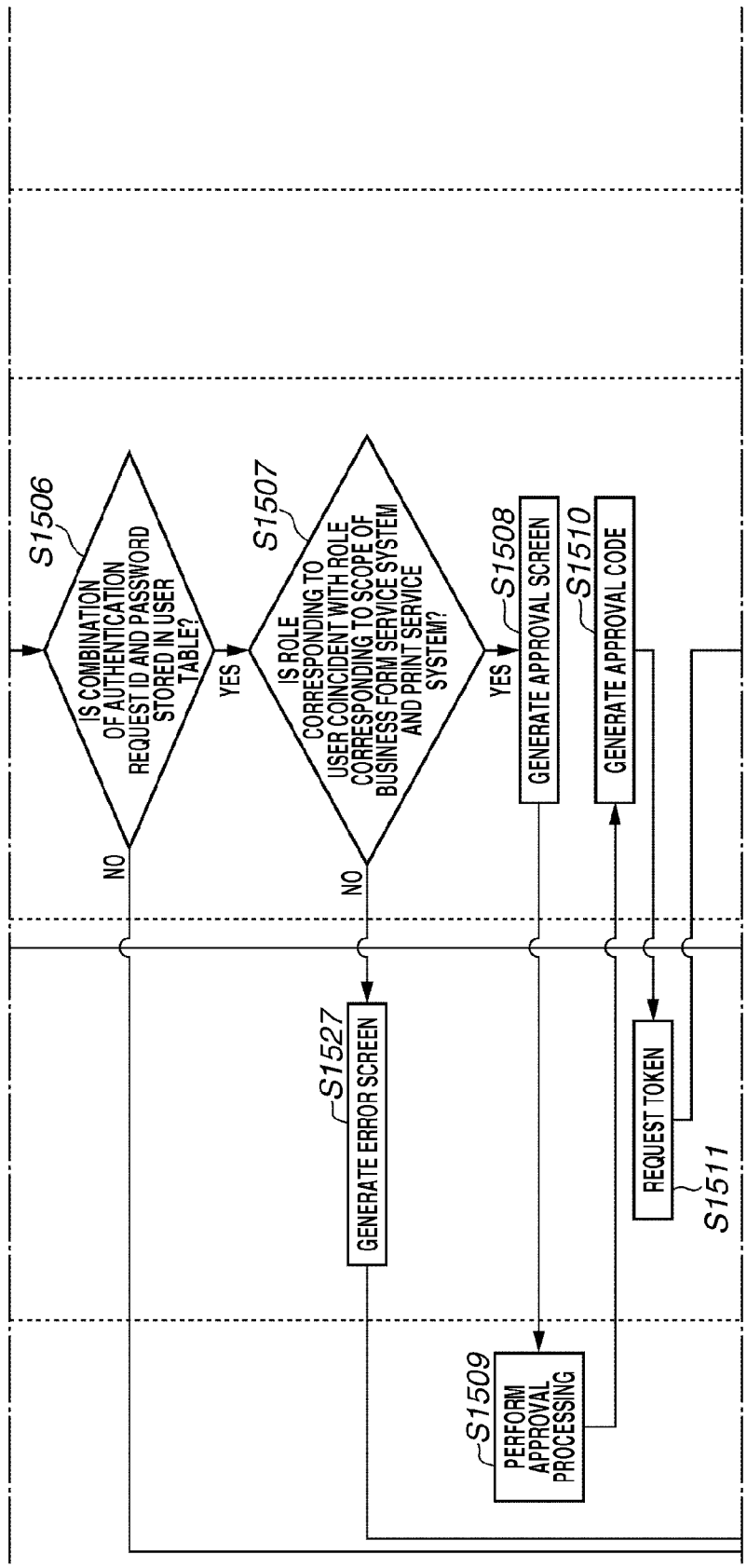

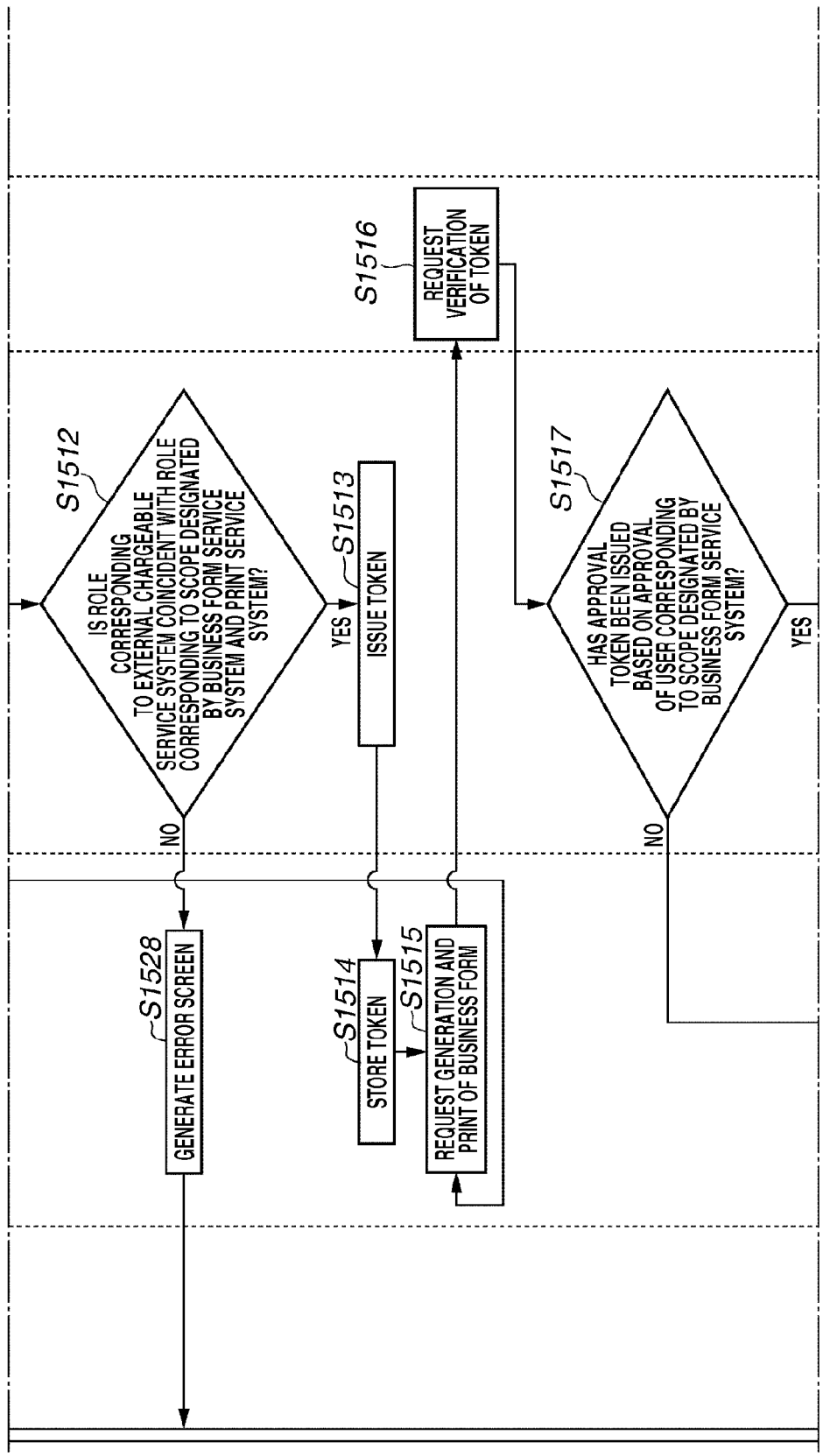

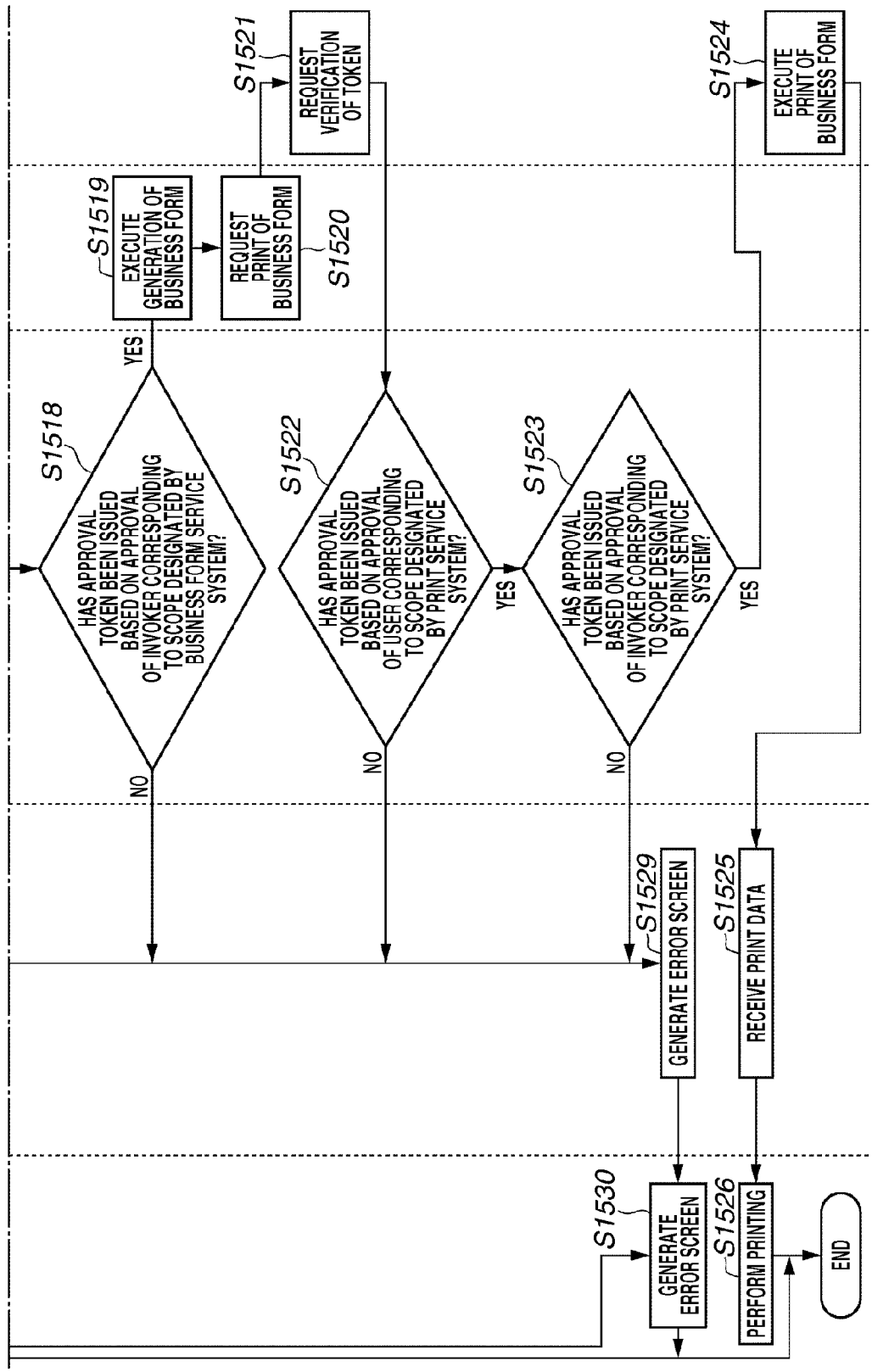

SYSTEM FOR DELEGATION OF AUTHORITY, ACCESS MANAGEMENT SERVICE SYSTEM, MEDIUM, AND METHOD FOR CONTROLLING THE SYSTEM FOR DELEGATION OF AUTHORITY

BACKGROUND OF THE INVENTION

1. Field of the Invention

The claimed invention relates to a system for delegation of authority that can mash up a plurality of online services by delegating an authority in realizing a mashup of these online services. The claimed invention further relates to an access management service system, a medium and a method for controlling the system for delegation of authority.

2. Description of the Related Art

A service that can provide a software function via the Internet, which is generally referred to as "cloud service", has been recently used. In many cases, two or more cloud services cooperate with each other to provide a new service.

To cause a plurality of cloud services to cooperate with each other, it is generally necessary to verify appropriateness of user's access authority while accessing an authentication mechanism equipped in respective services. A conventional system discussed in Japanese Patent Application Laid-Open No. 2004-252955 is a system in which two or more services can cooperate with each other and each service has an individual authentication mechanism. The system is configured to perform authentication processing for all services that constitute the system if the first authentication processing is required for any one of the services. A response returned in this case includes a merged authentication result. Thereafter, no authentication processing is required to use any one of the plurality of services.

On the other hand, it is conventionally known that "OAuth" is available as a technique that can safely and easily control accesses between services when the services cooperate with each other. The technique "OAuth" allows delegating a cooperation destination service access authority to the cooperation source service. When the OAuth-based capability of delegating the service access authority is incorporated in the authentication mechanism of respective services, a cooperation of two or more cloud services can be safely realized without storing any security information (e.g., user ID and password) in the service.

The OAuth-based capability of delegating the service access authority determines whether to allow the delegation of authority to access the cooperation source service by requesting a user who operates the cooperation source service to approve, when the cooperation source service cooperates with the cooperation destination service. If the user approves, the cooperation source service can temporarily use the cooperation destination service. However, a cooperation of a plurality of services in which a server itself that provides a cooperation source service is required to have an appropriate authority to access a cooperation destination service has not been taken into consideration.

SUMMARY OF THE INVENTION

According to an aspect of the claimed invention, a system for delegation of authority includes a first service system configured to provide a first online service, a second service system configured to provide a second online service and configured to communicate with the first service system, an access management service system configured to manage authentication information and approval token that are required to use a plurality of service systems including the second service system, and a client configured to be operated by a user who has registered authentication information required to use online services that can be provided by the first service system and the second service system. The first service system includes a first redirect instruction unit configured to transmit scope information to the client to identify the second online service, if it is necessary to use the second online service provided by the second service system in a process of responding to a processing request from the client operated by the user, and configured to cause the client to access the access management service system. The access management service system includes an approval screen transmission unit configured to confirm whether the user has an authority to use the second online service and, if it is confirmed that the user has the authority, configured to transmit an approval screen to the client to enable the user to confirm whether to approve that the first service system uses the second online service. The access management service system further includes a management unit configured to issue a code required to issue an approval token if it is confirmed that the user has approved via the approval screen, and manage the issued code in such a way as to be linked with the scope information acquired when accessed by the client. The access management service system further includes a second redirect instruction unit configured to transmit the code to the client and cause the client to access the first service system. The first service system further includes a transmission unit configured to transmit authentication information that is unique to the first service system and the code acquired when accessed by the client to the access management service system. The access management service system further includes a confirmation unit configured to identify an online service that the first service system wants to use based on the scope information linked with the received code, and confirm whether the identified online service is included in online services that can be used by the first service system based on the received authentication information that is unique to the first service system. The access management service system further includes an issuance unit configured to issue an approval token if it is confirmed that the identified online service is included in the online services that can be used by the first service system. The approval token issued by the first service system is usable to use the second online service and to realize a mashup service that causes the first online service and the second online service to cooperate with each other. According to an aspect of the claimed invention, a non-transitory computer readable medium encoded with instructions for an access management service comprising instructions. The access management service transmitting a first approval token to a first online service. The first approval token is associated with a particular user and a plurality of particular privileges accorded the particular user with a second online service. The access management service receiving a verification request of the first approval token from the second online service. The access management service verifying that the first approval token is associated with the plurality of particular privileges accorded the particular user with the second online service The access management service transmitting a message to the second online service if the access management service positively affirms that the first approval token is associated with the plurality of particular privileges accorded the particular user with the second online service.

Further features and aspects of the claimed invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the claimed invention and, together with the description, serve to explain the principles of the claimed invention.

FIG. 4 illustrates an example service cooperation data management table according to an exemplary embodiment.

FIG. 8 is a table illustrating an example data structure that can be stored in an access management service system.

FIG. 9 is a table illustrating an example data structure that can be stored in the access management service system to manage authorities to execute business form service and print service.

FIGS. 10A-C are a processing flow of delegation of authority processing that can be controlled according to a first exemplary embodiment of the claimed invention.

FIG. 11 is a table illustrating an example data structure that manages an execution authority of each mashup processing that can be executed by an external chargeable service system.

FIG. 13 is a table illustrating an example data structure of approval codes that can be stored in the access management service system.

FIG. 14 is a table illustrating an example data structure of an approval token that can be stored in the access management service system.

FIGS. 15A-D are a processing flow of delegation of authority processing that can be controlled according to a second exemplary embodiment of the claimed invention.

DESCRIPTION OF THE EMBODIMENTS

Figure 1:
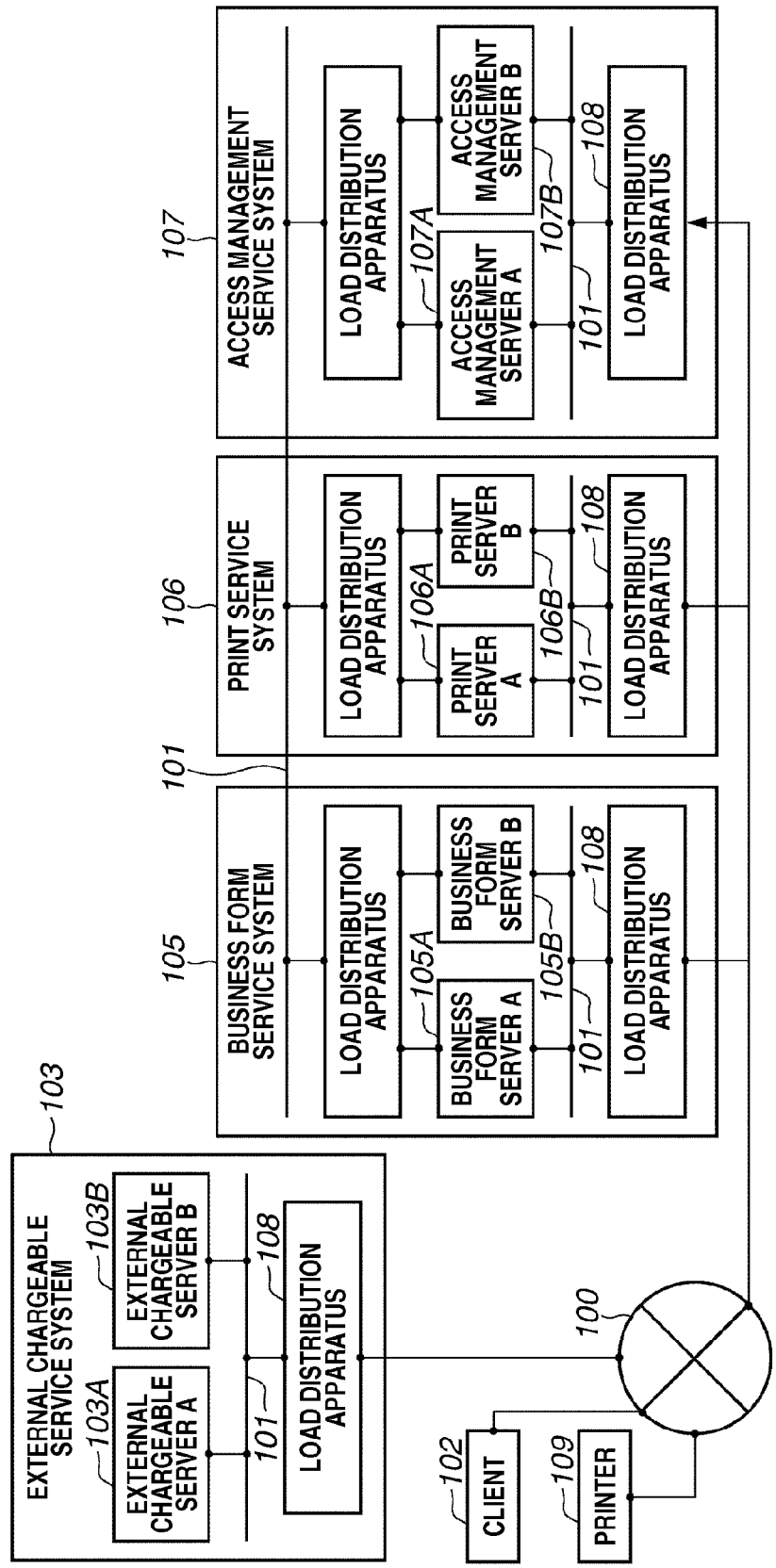
FIG. 1 illustrates an entire system according to an exemplary embodiment.

Various exemplary embodiments, features, and aspects of the claimed invention will be described in detail below with reference to the drawings.

An embodiment of the claimed invention is applicable to a cooperation of two services in which a server that provides a cooperation source service is required to have an appropriate authority to access a cooperation destination service. In the cooperation with such services, it is ideal to confirm whether each of a user and the cooperation source service has an appropriate authority to access the cooperation destination service before executing the service at the time of delegation of authority.

If the authority to access the cooperation destination service is delegated in a state where the cooperation source service has no authority to access the cooperation destination service even when the user has an authority to access the cooperation destination service, it will be later found that the intended cooperation of services cannot be realized at the execution time of the services. In this case, issuance of an approval token is useless.

As another reason, a service system that provides the cooperation destination service does not confirm the authority to use the cooperation source service if the usage of the online service is based on the usage of an approval token. Therefore, it may be feasible to realize a cooperation of services even in a case where the authority is inappropriate. The reliability of the system will deteriorate.

An embodiment of the claimed invention is directed to a technique that can solve at least one of the above-described problems.

Hereinafter, a first exemplary embodiment of the claimed invention is described below. Various service providers can provide various online services via the Internet. There will be a single online service that is managed by a single service provider. On the other hand, a plurality of online services managed by a plurality of service providers may be combined to realize a single solution.

The latter case is generally referred to as "mashup" processing, according to which a user feels as if the user accesses a single web site or uses a single web service. However, in back-end processing to be performed to realize the above-described mashup processing, a plurality of online services cooperate with each other to realize the solution in cooperation with a module group that provides necessary online services.

In the present exemplary embodiment, the technical term "online service" is a group of functions that can be provided by web sites, web applications, and web services. The web sites, the web applications, and the web services are software that can be executed by a server computer. The claimed invention does not intend to limit the content of each online service. For example, the online service can include a print data conversion service, a business form generation service (i.e., a service usable to generate a business form), or a device management service (i.e., a service usable to manage various data including device status and output a report of the managed data).

FIG. 1 illustrates a network configuration of a system for delegation of authority according to an exemplary embodiment of the claimed invention, in which various online services are present. An internet 100 is a public network, such as the Internet or the like, via which an external device can access a device that constitutes the system for delegation of authority. An intranet 101 is a private network, such as a local area network (LAN), which does not accept an access from an external device. In one embodiment of the present invention the intranet 101 is a virtual private network (VPN). A client 102 is a client terminal that can be used when a user uses an online service of a personal computer or a mobile terminal via the internet 100.

An external chargeable service system 103 is functionally operable as an online service system that can realize an online mashup with a business form service system 105 and a print service system 106. For example, the external chargeable service system 103 can cooperate with the business form service system 105 to provide a user with the business form generation service. The business form generation service is a service that includes sequential processes of transmitting data stored in a service cooperation data management unit 303 to the business form service system 105 via the Internet, combining the transmitted data with a business form stored in a business form data management unit 504, and transmitting business form data to the client 102. The business form service system 105 is functionally operable to provide the above-described service.

Further, the external chargeable service system 103 can communicate with the business form service system 105 and the print service system 106. The external chargeable service system 103 can provide a user with a business form generation and print service by cooperating with a service provided by the service system through communications. The business form generation and print service is a service that includes transmitting business form data created using the business form generation service to the print service system 106 via the Internet and providing print data converted into data having a format printable by a printer 109. More specifically, the external chargeable service system 103 according to the first exemplary embodiment provides a mediation service that causes the business form service system 105 and the print service system 106 to cooperate with each other. The external chargeable service system 103 is not limited to the mediation service and can be a system that can print business form data with some value added.

The external chargeable service system 103 corresponds to a first service system. A service provided by the external chargeable service system 103 corresponds to a first online service. Further, the business form service system 105 and/or the print service system 106 that can cooperate with the first service system corresponds to a second server system. A service that can be provided by at least one of these service systems corresponds to a second online service. For example, the second online service according to the first exemplary embodiment is a business form service or a print service.

The external chargeable service system 103 includes two external chargeable servers 103A and 103B and a load distribution apparatus 108. The external chargeable servers 103A and 103B are connected to the load distribution apparatus 108 via the intranet 101. The client 102, the external chargeable service system 103, and other online service system can communicate with each other via the internet 100. The load distribution apparatus 108 is an apparatus that can process various requests received via the internet 100 in a distributed fashion. Although the example configuration of the external chargeable service system 103 illustrated in FIG. 1 includes two external chargeable servers 103A and 103B, the number of the external chargeable servers can be only one or can be three or more.

An access management service system 107 can manage authentication information and approval token of each user who uses the business form service system 105 and the print service system 106. A user or a service system (i.e., a cooperation source), if the authentication information or the approval token is inappropriate, cannot use a service system that is managed by the access management service system 107. Each user is required to register requisite authentication information beforehand to use a service system managed by the access management service system 107. After a user has completed the registration of authentication information, the user can use the service each time the user inputs the registered authentication information via the client if the authentication processing is successfully done. On the other hand, a service system (i.e., a cooperation source) acquires an access token using a below-described method and transmits the acquired access token to the access management service system 107. If the validity of the access token is verified, the service system can realize a service mashup operation.

The access management service system 107 includes two access management servers 107A and 107B and a load distribution apparatus 108. The access management servers 107A and 107B are connected to the load distribution apparatus 108 via a private network 101. The access management service system 107 can process various requests received by the load distribution apparatus 108 via the intranet 101 from the business form service system 105 and the print service system 106 in a distributed fashion. Further, the access management service system 107 can process requests received from the client 102 via the internet 100. Although the example configuration of the access management service system 107 illustrated in FIG. 1 includes two access management servers 107A and 107B, the number of the access management servers can be only one or can be three or more.

The business form service system 105 is an online service that can generate a business form according to a request from the client 102 or the external chargeable service system 103 received via the internet 100. The business form service system 105 includes two business form servers 105A and 105B and a load distribution apparatus 108. The business form servers 105A and 105B are connected to the load distribution apparatus 108 via an intranet 101. The client 102, the external chargeable service system 103, and other online service system can communicate with each other via the internet 100. The load distribution apparatus 108 is an apparatus that can process various requests received via the internet 100 in a distributed fashion. Although the example configuration of the business form service system 105 illustrated in FIG. 1 includes two business form servers 105A and 105B, the number of the business form servers can be only one or can be three or more.

The print service system 106 is an online service that can convert business form data into predetermined data having a format printable by the printer 109 according to a request received from the client 102 or the external chargeable service system 103 via the internet 100. The print service system 106 includes two print servers 106A and 106B and a load distribution apparatus 108. The print servers 106A and 106B are connected to the load distribution apparatus 108 via an intranet 101. The client 102, the external chargeable service system 103, and other online service system can communicate with each other via the internet 100. The load distribution apparatus 108 is an apparatus that can process various requests received via the internet 100 in a distributed fashion. Although the example configuration of the print service system 106 illustrated in FIG. 1 includes two print servers 106A and 106B, the number of the print servers can be only one or can be three or more.

The printer 109 is a printing apparatus that can receive print data generated by the print service system 106, via the internet 100, and can perform printing based on the received print data. The external chargeable service system 103 is an online service that is managed by a service provider that is different from a service provider that manages the business form service system 105 and the print service system 106. The external chargeable service system 103 can communicate via the internet 100.

Figure 2:
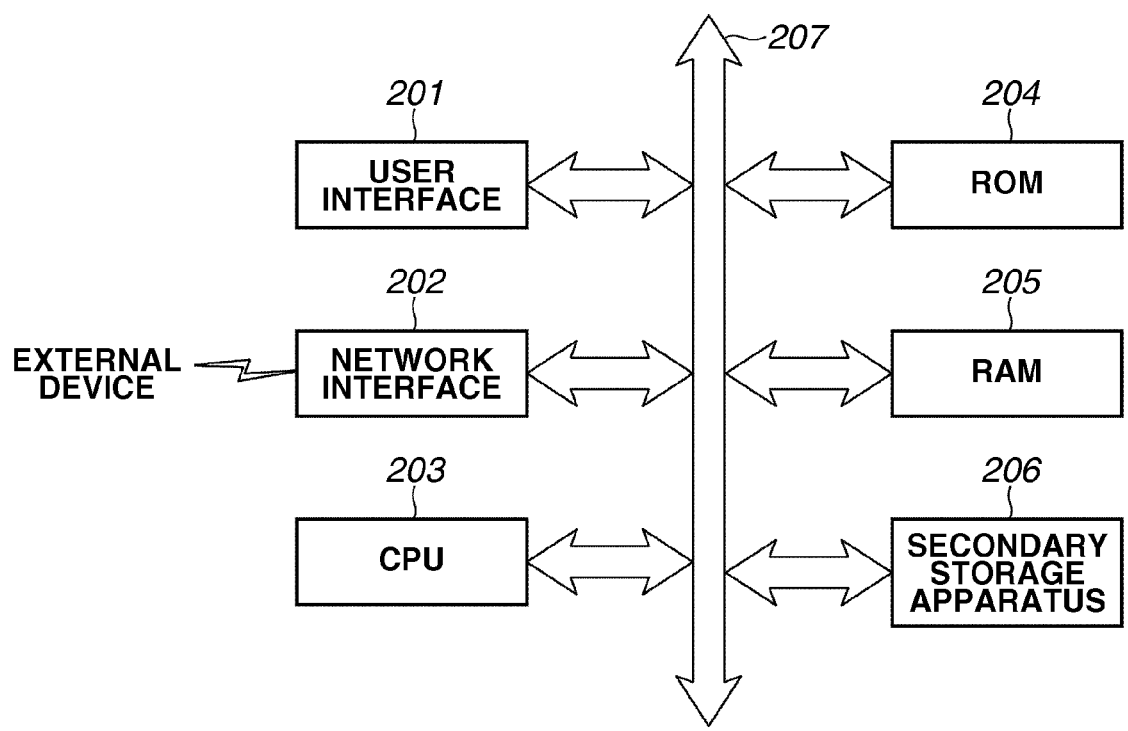
FIG. 2 illustrates an example hardware configuration of a server according to an exemplary embodiment.

FIG. 2 illustrates a logical configuration of an information processing function of a server computer that constitutes the server illustrated in FIG. 1 and can execute software (e.g., web site, web application, and web service). A user interface 201 is hardware that can input information via a keyboard and a mouse and can output information to a display device. A remote desktop or another computer is usable to access and operate if a computer is not equipped with the above-described hardware. A network interface 202 is hardware that can communicate with an external computer or a network device that is accessible via an appropriate network (e.g., LAN).

A central processing unit (CPU) 203 can execute programs loaded from a read only memory (ROM) 204, a random access memory (RAM) 205, and a secondary storage apparatus 206 to realize various services. The ROM 204 is a storage apparatus that stores installed programs and data. The RAM 205 is a temporary memory area. The secondary storage apparatus 206 is an external storage apparatus represented by a hard disk drive (HDD). The above-described units 201 to 206 are connected to each other via an input/output interface 207.

Figure 3:
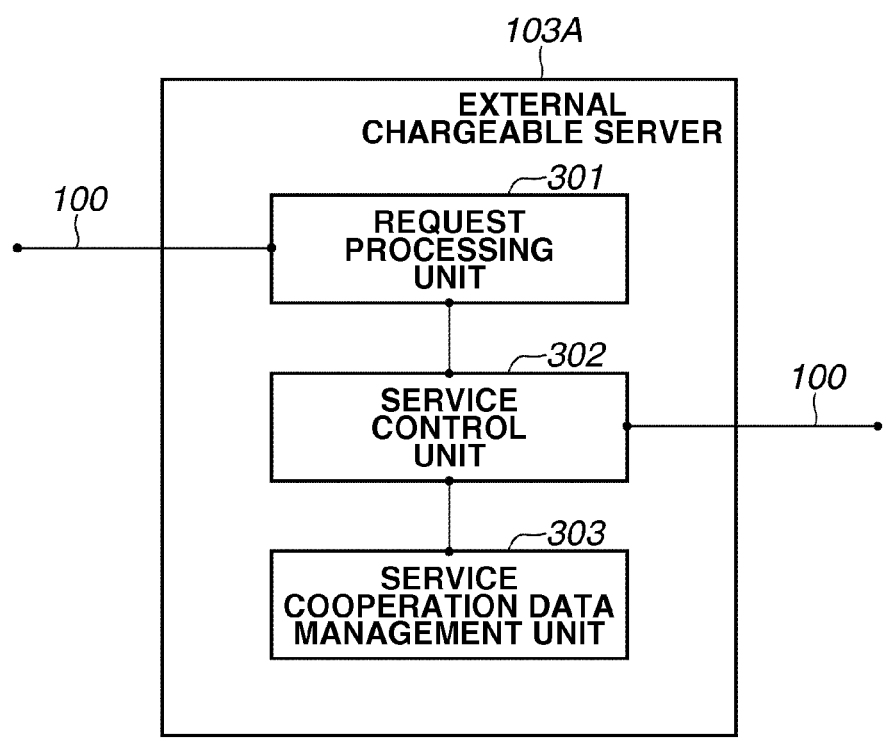
FIG. 3 illustrates an example software configuration of an external chargeable server according to an exemplary embodiment.

FIG. 3 is a block diagram illustrating a software configuration of the external chargeable server 103A. To realize each processing unit illustrated in FIG. 3 and a below-described software configuration of the service system, the CPU 203 executes a program loaded into the RAM 205 from the ROM 204.

A request processing unit 301 is a processing unit configured to process a service request that the external chargeable service system 103 has received from the client 102 via the internet 100. The load distribution apparatus 108 receives service requests from the client 102 via the internet 100. Subsequently, the load distribution apparatus 108 sends the received requests to the external chargeable servers via the intranet 101 in a distributed fashion. The request processing unit 301 processes the received request.

A service control unit 302 performs necessary processing according to the request received by the request processing unit 301, and transmits response data to a calling source. In this case, the service control unit 302 transmits a business form generation request to the business form service system 105 and transmits a business form print request to the print service system 106, via the internet 100, and receives response data indicating a request processing result from each service system.

The service cooperation data management unit 303 manages various data to be used to generate the business form generation request and the business form print request that the external chargeable service system 103 can transmit to the business form service system 105 and the print service system 106. An approval code management unit 304 manages approval code data. A token management unit 305 manages approval token data.

FIG. 4 is an example table that illustrates various data that can be used to generate the business form generation request and the business form print request to be transmitted to the business form service system 105 and the print service system 106, respectively. The external chargeable service system 103 manages the data classified in a table structure illustrated in FIG. 4.

A service cooperation table 400, which includes a service name column 401, an Application Program Interface column (hereinafter, referred to as "API column") 402, and a scope ID column 403, is stored in the service cooperation data management unit 303. The service name column 401 is a column that stores service names of cooperation destinations. The API column 402 is a column that stores URL information of each online service system, which is opened to the public to receive requests from other online service systems. When an online service system performs mashup processing, the online service system transmits a service request to the URL stored in the API column 402. For example, in the first exemplary embodiment, the external chargeable service system 103 confirms the storage of the data that corresponds to the business form service system 105.

Then, the external chargeable service system 103 transmits a service request to the business form service system 105 based on the value stored in the API column 402 of the service cooperation table 400 to realize the mashup processing in cooperation with the business form service system 105. The scope ID column 403 stores an authority range in which the external chargeable service system 103 can use each online service.

The scope ID column 403 is a column that stores scope information to be used when the access management service system 107 determines whether the external chargeable service system 103 has an authority to cooperate with each online service in executing the online service. Based on the scope information, the access management service system 107 can identify an online service that the external chargeable service system 103 intends to use. Further, the access management service system 107 can use an online service identified based on the scope information and below-described role ID. The external chargeable service system 103 can use an online service identified based on the scope information.

An approval code table 410, which includes a service name column 411 and an approval code ID column 412, is stored in the service cooperation data management unit 303. The service name column 411 is a column that stores each service name of a cooperation target. The approval code ID column 412 is a column that stores approval code ID 1301 indicating an approval code generated by the access management service system 107. When the access management service system 107 generates an approval code in below-described step S1010, the access management service system 107 transmits an approval code ID that indicates the generated approval code to the external chargeable service system 103. Example approval code issuance processing is described in detail below.

The value of each approval code ID stored in the approval code ID column 412 is a value to be transmitted when the external chargeable service system 103 requests the access management service system 107 to issue an approval token that is required to execute the business form service system 105. Further, the approval code ID is included in an approval token acquisition request to be transmitted when the external chargeable service system 103 accesses the access management service system 107. Example processing that can be performed by the access management service system 107 to issue an approval token in response to the reception of the approval code ID from the external chargeable service system 103 is described in detail below.

An approval token table 420, which includes a service name column 421 and a token ID column 422, is stored in the service cooperation data management unit 303. The service name column 421 is a column that stores each service name of a cooperation target. The token ID column 422 is a column that stores approval token ID 1401 indicating the approval token generated by the access management service system 107. When the access management service system 107 generates an approval token in below-described step S1013, the access management service system 107 transmits an approval token ID that indicates the generated approval token to the external chargeable service system 103. Example approval token issuance processing is described in detail below.

The value of each approval token ID stored in the token ID column 422 is a value to be transmitted when the external chargeable service system 103 requests the business form service system 105 to generate a business form or requests the print service system 106 to print a business form. Example processing that can be performed by the business form service system 105 to execute the business form generation request or by the print service system 106 to execute the business form print request in response to the reception of the approval token ID from the external chargeable service system 103 is described in detail below.

Figure 5:
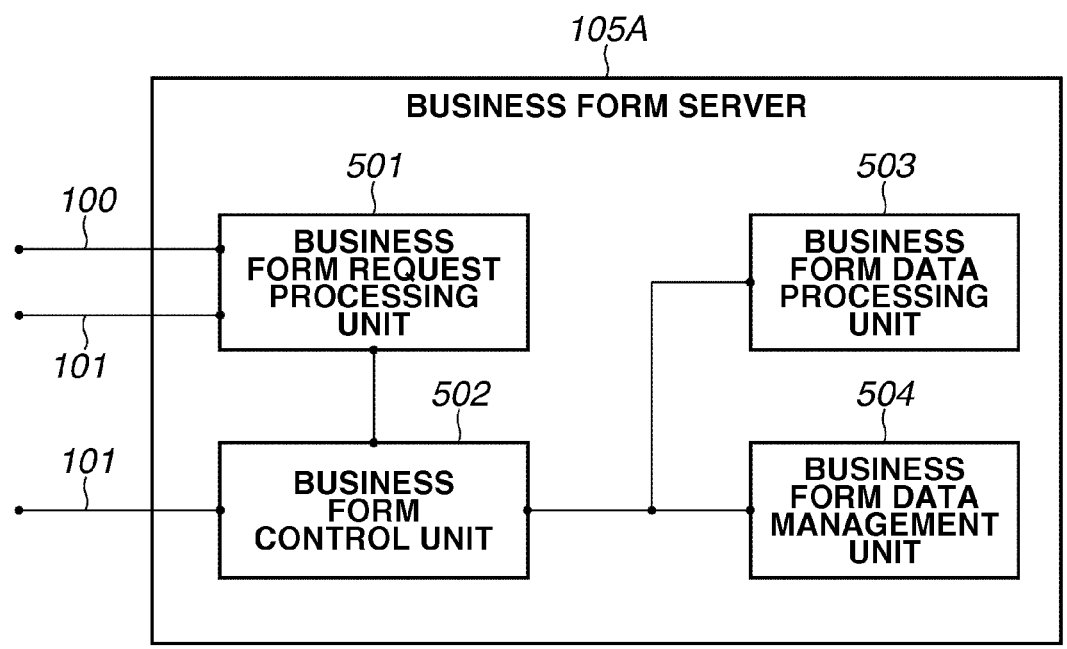
FIG. 5 illustrates an example software configuration of a business form server according to an exemplary embodiment.

FIG. 5 is a block diagram illustrating an internal structure of the business form server 105A. A business form request processing unit 501 can receive a business form data generation request and a business form data acquisition request from the client 102 via the internet 100. Further, the business form request processing unit 501 can receive a business form data generation request and a business form data acquisition request from a cooperation service 104 via the intranet 101.

A business form control unit 502 can perform necessary processing according to a request received by the business form request processing unit 501, and can transmit response data to a calling source. In this case, the business form control unit 502 transmits a request to the access management service system 107 via the intranet 101 and receives response data indicating a request processing result from the access management service system 107.

A business form data processing unit 503 can receive the business form data generation request from the business form control unit 502 and generate business form data. Further, the business form data processing unit 503 transmits a response including the generated business form data to the business form control unit 502.

The business form data management unit 504 can register and manage business form data that can be used in business form data generation processing to be performed by the business form data processing unit 503. Further, the business form data management unit 504 can receive the business form data acquisition request from the business form control unit 502 and transmit a response including business form data to the business form control unit 502.

Figure 6:
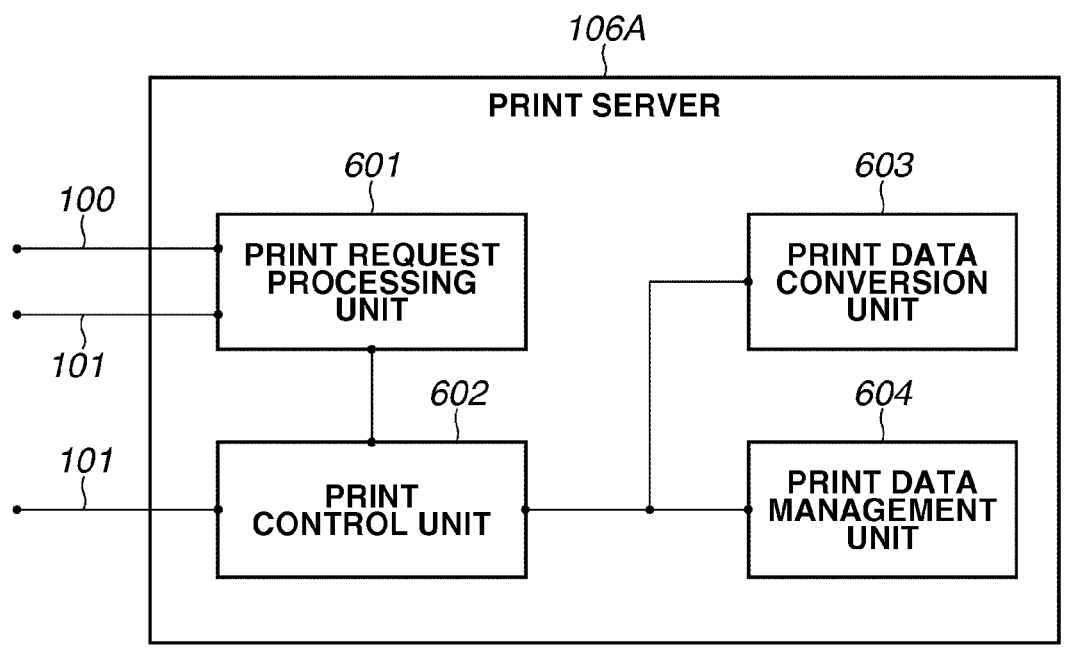
FIG. 6 illustrates an example software configuration of a print server according to an exemplary embodiment.

FIG. 6 is a block diagram illustrating an internal structure of the print server 106A. A print request processing unit 601 can receive a print data conversion request and a print data acquisition request from the client 102 via the internet 100. Further, the print request processing unit 601 can receive a print data conversion request and a print data acquisition request from the cooperation service 104 via the intranet 101.

A print control unit 602 can perform necessary processing according to a request received by the print request processing unit 601 and can transmit response data to a calling source. In this case, the print control unit 602 transmits a request to the access management service system 107 via the intranet 101 and receives response data indicating a request processing result from the access management service system 107.

A print data conversion unit 603 can receive the print data conversion request from the print control unit 602 and can generate print data. Further, the print data conversion unit 603 can transmit a response including converted print data to the print control unit 602.

A print data management unit 604 can register and manage the print data converted by the print data conversion unit 603. Further, the print data management unit 604 can receive the print data acquisition request from the print control unit 602 and can transmit a response including the print data.

Figure 7:
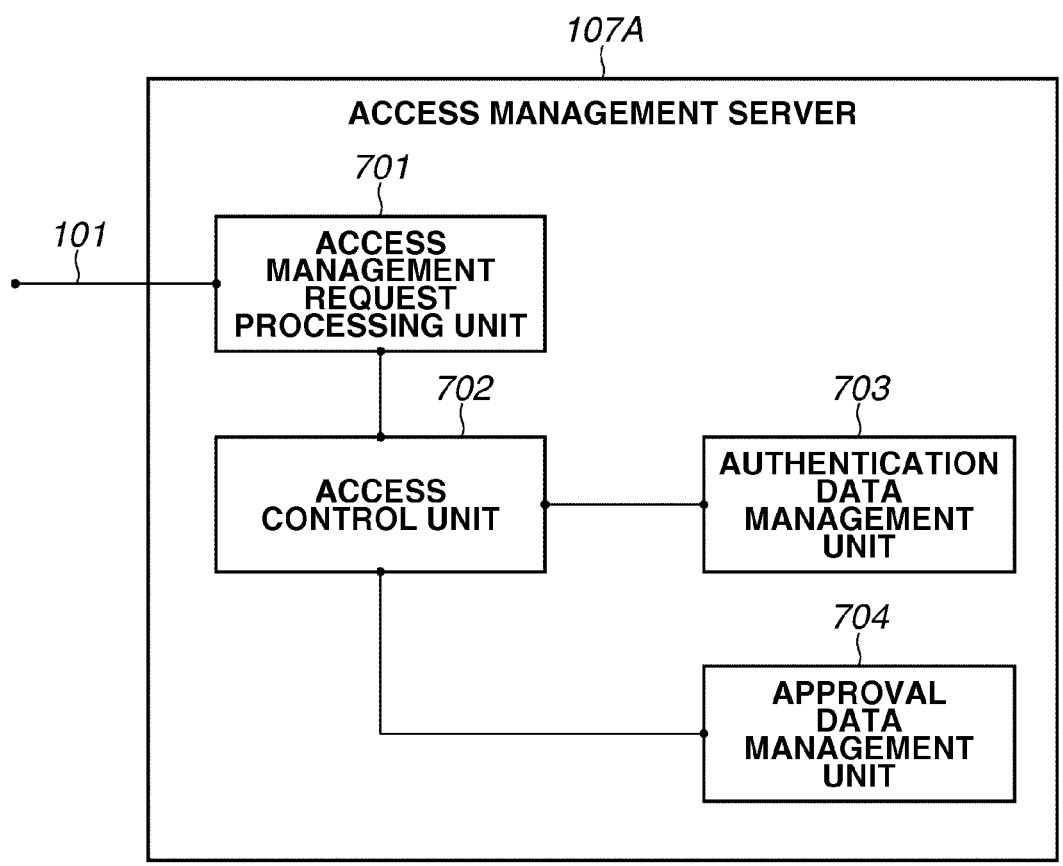
FIG. 7 illustrates an example software configuration of an access management server according to an exemplary embodiment.

FIG. 7 is a block diagram illustrating an internal structure of the access management server 107A. An access management request processing unit 701 can receive an authentication and approval request from other online service system via the internet 100 and the intranet 101. Further, if the access management request processing unit 701 receives response data from an access control unit 702, the access management request processing unit 701 can transmit the response data to a calling source.

The access control unit 702 can generate response data in response to the authentication and approval request, based on data acquired from an authentication data management unit 703 and an approval data management unit 704. The access control unit 702 can transmit response data to the access management request processing unit 701. The authentication data management unit 703 can manage data representing authentication information including user account. The approval data management unit 704 can manage the approval token data. Then, the access control unit 702 performs authentication processing to verify correctness of the received authentication information or approval token based on the managed authentication information or approval token.

FIG. 8 and FIG. 9 illustrate example table formats of the data structure stored in the access management service system 107. FIG. 8 is a table illustrating an example data structure that manages information of a user who can use the business form service system 105 and the print service system 106. Further, the table illustrated in FIG. 8 can manage user ID and password that are uniquely allocated to the external chargeable service system 103 to identify the external chargeable service system 103.

The user table 800, which includes a user ID column 801 and a password column 802, is stored in the authentication data management unit 703. The user ID column 801 is a column that stores user ID (i.e., identifier) of each user. The password column 802 is a column that stores password (i.e., secret information) of each user. The user table 800 stores user ID and password of each user who operates the external chargeable service system 103, which correspond to the business form service system 105 and the print service system 106. Further, as described above, the user table 800 stores user ID and password of the external chargeable service system 103 that actually transmits a request in the mashup processing. The authentication information that is unique to the external chargeable service system 103 is the authentication information that corresponds to the business form service system 105 and the print service system 106.

In the following description, a user who operates the external chargeable service system 103 is referred to as "user." The external chargeable service system 103 that receives a request of a business form generation instruction from the user and actually transmits a business form generation request to the business form service system 105 is referred to as "invoker." More specifically, the user table 800 stores at least one set of a user ID and a corresponding password and a set of an invoker ID and a corresponding password. The external chargeable service system 103 can use a service system managed by the access management service system 107 only when the external chargeable service system 103 is successful in authentication processing to be performed based on the invoker ID and the password.

FIG. 9 is a table illustrating a data structure that manages execution authority of each online service system, such as the business form service system 105 or the print service system 106. A role table 910, which includes a role ID column 911 and a role name column 912, is stored in the approval data management unit 704. The role ID column 911 is a column that stores role information that can execute each online service. The role name column 912 is a column that stores role names each identifying a value in the role ID column 911. The role name is mainly a value to be used when the role information is displayed on a display device (not illustrated) of the client 102.

A user allocation role table 920, which includes a user ID column 921 and a role ID column 922, is stored in the approval data management unit 704. The user ID column 921 is a column that stores user ID (i.e., identifier) of each user. The user ID column 921 stores a value that is identical to the value stored in the user ID column 801 of the user table 800. The role ID column 922 is a column that stores role information that can execute each online service. The role ID column 922 stores a value that is identical to the value stored in the role ID column 911 of the role table 910. As described above, in a case where a user indicated by a user ID or a service system has an authority to execute an online service, the user ID is managed by linking it with a role ID indicating the executable authority.

When a user stored in the user table 800 uses each online service system (e.g., the business form service system 105 or the print service system 106), it is necessary to store a user ID and a role ID corresponding to each online service system in the user allocation role table 920 while associating them with each other. Hence, it is necessary to perform the above-described linking management. Example processing for confirming user's authority to use an online service is described in detail below. The determination for confirming user's authority to execute an online service system is performed with reference to a user ID value and a role ID value, which are registered in the user table 800 and the user allocation role table 920. More specifically, it is feasible to confirm whether a user has an authority to use an online service by checking whether a value in the user ID column 921 coincides with a value in the user ID column 801 and referring to a role ID 922 linked to the user ID column 921.

Hereinafter, an example sequence of processing, which can be realized by an online service cooperation according to an embodiment of the claimed invention, in which the external chargeable service system 103 executes the business form service system 105 to generate business form data, is described with reference to FIG. 10. As described above, the usage of the business form service by the business form service system 105 is controlled by the access management service system 107.

In the present exemplary embodiment, the service provider that manages the external chargeable service system 103 is different from the service provider that manages the business form service system 105. Therefore, when a user uses a service of the external chargeable service system 103, the user is required to be in a state where the user can use both the external chargeable service system 103 and the business form service system 105. Further, in the business form generation service the service system that actually transmits a business form generation request to the business form service system 105 is the external chargeable service system 103. Therefore, the external chargeable service system 103 can be authenticated as a user of the business form service 105.

In step S1001, a user operates the client 102 to transmit a request of the business form generation instruction to the external chargeable service system 103 via the internet 100. In this case, the external chargeable service system 103 generates screen information (not illustrated) that enables the user to select business form data that is required to generate a business form and data to be inserted to the business form. The external chargeable service system 103 causes a web browser (not illustrated) installed on the client 102 to display the generated screen.

In generating the request of the business form generation instruction, the user selects business form data to be used in the business form generation and data to be inserted to the business form from the screen information displayed by the web browser. As a status of the external chargeable service system 103 at the timing of step S1001, it is necessary to use the business form service in a process of responding to a processing request from the client operated by the user. Even when the external chargeable service system 103 is used, it may be unnecessary to cooperate with an external service system.

In step S1002, the request processing unit 301 receives the request of the business form generation instruction transmitted from the client 102. The request processing unit 301 analyzes the business form data to be used in the business form generation and the data to be inserted to the business form, with reference to the received request of the business form generation instruction. The request processing unit 301 sends the analyzed data to the service control unit 302. The service control unit 302 requests the token management unit 305 to confirm whether an approval token ID required to execute the business form service system 105 is stored in the approval token ID column 422 of the token table 420.

If it is determined that the approval token ID is stored in the approval token ID column 422 (YES in step S1002), the operation proceeds to step S1015. The external chargeable service system 103 transmits a business form generation request to the business form service system 105. If it is determined that the approval token ID is not stored in the approval token ID column 422 (NO in step S1002), the operation proceeds to step S1003. The external chargeable service system 103 generates an approval acquisition request to be sent to the business form service system 105 and transmits the generated approval acquisition request to the access management service system 107.

In this case, the external chargeable service system 103 generates the approval acquisition request with reference to the service cooperation table 400, which stores the API column 402 value and the scope ID column 403 value that correspond to the business form service system 105. The reason why the approval acquisition request includes the scope ID is because the access management service system 107 verifies whether each of the external chargeable service system 103 and the user has an authority to use a service of the business form service system 105.

The access management service system 107 refers to the scope table 1100 and the user allocation role table 920 according to the scope ID value included in the approval acquisition request. The access management service system 107 verifies whether each of the user and the external chargeable service system 103 has an authority to use the service of the business form service system 105. In this case, confirming the usage authority allocated to the user is, in other words, confirming whether the user has an authority to determine whether to approve that the external chargeable service system 103 uses an online service.

In the present exemplary embodiment, it is presumed that the approval acquisition request transmitted from the external cooperation service 103 to the access management service system 107 in step S1003 includes "Scope_FormUser" and "Scope_FormInvoker" values as scope IDs. In step S1004, the access management request processing unit 701 receives the approval acquisition request from the external chargeable service system 103 and sends the received approval acquisition request to the access control unit 702. The access control unit 702 generates an authentication screen (not illustrated) that encourages the user to perform authentication processing, and causes the web browser (not illustrated) installed on the client 102 to display the generated authentication screen.

The scope information to be transmitted in step S1003 is sent to the access management service system 107 via the client 102. More specifically, while the external chargeable service 103 transmits the scope information to the client 102, the external chargeable service 103 sends a redirect instruction to the access management service system 107 to perform redirect processing. The technical term "redirect" indicates accessing a computer designated by a redirect instruction. If the client receives the redirect instruction, the client transmits the received scope information to the access management service system 107 that is designated by the redirect instruction. In the first exemplary embodiment, it is presumed that URL information is usable to identify the computer designated by the redirect instruction. The access management service system 107 receives the scope information from the client that accesses according to the redirect instruction and confirms the authority of the user.

In step S1005, the user inputs the user ID and the password on the authentication screen displayed by the web browser of the client 102, and transmits an authentication request to the access management service system 107. In step S1006, the access management request processing unit 701 receives the authentication request from the client 102 and sends the received authentication request to the access control unit 702. The access control unit 702 verifies the user ID and the password included in the authentication request.

More specifically, the access control unit 702 confirms whether a combination of the user ID and the password included in the authentication request is already registered in the user table 800 stored in the authentication data management unit 703. If the combination of the user ID and the password included in the authentication request is already registered in the user table 800, the access control unit 702 determines that the user who is currently operating the client 102 is one of the users managed by the access management service system 107. Then, the operation proceeds to step S1007 in which the access management service system 107 continues the processing in the following manner.

If the combination of the user ID and the password included in the authentication request is not yet registered in the user table 800, the access control unit 702 determines that the user who is currently operating the client 102 is not any one of the users managed by the access management service system 107. The access management service system 107 generates an authentication error screen (not illustrated) and transmits the generated authentication error screen to the web browser (not illustrated) installed on the client 102.

In step S1007, the access control unit 702 confirms whether the user having been authenticated in step S1006 has an authority to receive a service to be provided by a cooperation destination service system of the external chargeable service system 103. More specifically, the access control unit 702 acquires a role ID linked with the user ID stored in the user ID column 801, which corresponds to the user having been authenticated in step S1006, with reference to the user allocation role table 920. For example, if the user ID of the user having been authenticated in step S1006 is "User1", the role ID to be acquired by the access control unit 702 is "UserRole_Form." Next, the access control unit 702 acquires a role ID linked with the scope ID included in the approval acquisition request having been received in step S1004, with reference to the information stored in the scope table 1100.

FIG. 11 is a table illustrating an example data structure of services that the external chargeable service system 103 can receive from the cooperation destination service system in step S1007. The scope table 1100, which includes a scope ID column 1101 and a role ID 1102, is stored in the approval data management unit 704. The scope ID column 1101 is a column that stores the scope information. In the present exemplary embodiment, the scope information is stored in the scope ID column 403 of the service cooperation table 400. The scope information stored in the scope ID column 1101 is similar to the scope information included in the approval acquisition request received by the access management service system 107 in step S1004. The role ID column 1102 is a column that stores role information that can execute each online service. The role information stored in the role ID column 1102 is similar to the role information stored in the role ID column 911 of the role table 910. The access management service system 107 confirms whether the external chargeable service system 103 can receive a service from a cooperation destination, based on the information stored in the scope table 1100.

For example, according to the scope table 1100, scope ID values that correspond to the business form service system 105 included in the approval acquisition request are "Scope_FormUser" and "Scope_FormInvoker." Therefore, two role IDs to be acquired in this case are "UserRole_Form" and "ServiceRole_Form." Finally, the access control unit 702 compares the role ID acquired with reference to the user allocation role table 920 with the role ID acquired with reference to the scope table 1100. If it is confirmed that the compared role IDs coincide with each other, the access control unit 702 determines that the user having been authenticated in step S1006 has an authority to use the online service of the business form service system 105.

When the above-described determination result is obtained, it is determined that the user can approve that the external chargeable service system 103 uses the business form service system 105 within the range of the user's authority. The user executes approval processing described in step S1009. For example, the role ID "UserRole_Form" linked with the user ID "User1" coincides with the role ID "UserRole_Form" linked with the scope ID "Scope_FormUser." Therefore, the access control unit 702 determines that the user having the user ID "User1" has an authority to execute the business form service system 105. The invoker's scope information acquired in the above-described manner and the role ID acquired based on the invoker's scope information can be used in step S1012 as described below.

The access control unit 702 compares the role ID acquired with reference to the user allocation role table 920 with the role ID acquired with reference to the scope table 1100. If it is determined that the compared role IDs are different from each other (NO in step S1007), the access control unit 702 determines that the user of the business form service system 105 having been authenticated in step S1006 has no authority to use the online service of the business form service system 105. Then, the access control unit 702 transmits a user's scope error notification to the external chargeable service system 103 via the web browser of the client 102. Then, the operation proceeds to step S1022.

In step S1022, the request processing unit 301 receives the scope error notification from the access management service system 107 via the web browser of the client 102 and sends the received scope error notification to the service control unit 302. When the service control unit 302 receives the scope error notification, the service control unit 302 generates a scope error screen (not illustrated) and transmits the generated scope error screen to the web browser (not illustrated) installed on the client 102.

If the client 102 receives the scope error screen from the external chargeable service system 103, then in step S1025, the client 102 causes the web browser to display the received scope error screen and interrupts the business form generation instruction having been instructed in step S1001. The user recognizes that the user has no authority to use the business form service (i.e., the service that corresponds to the second online service), while viewing the scope error screen.

Figure 12:
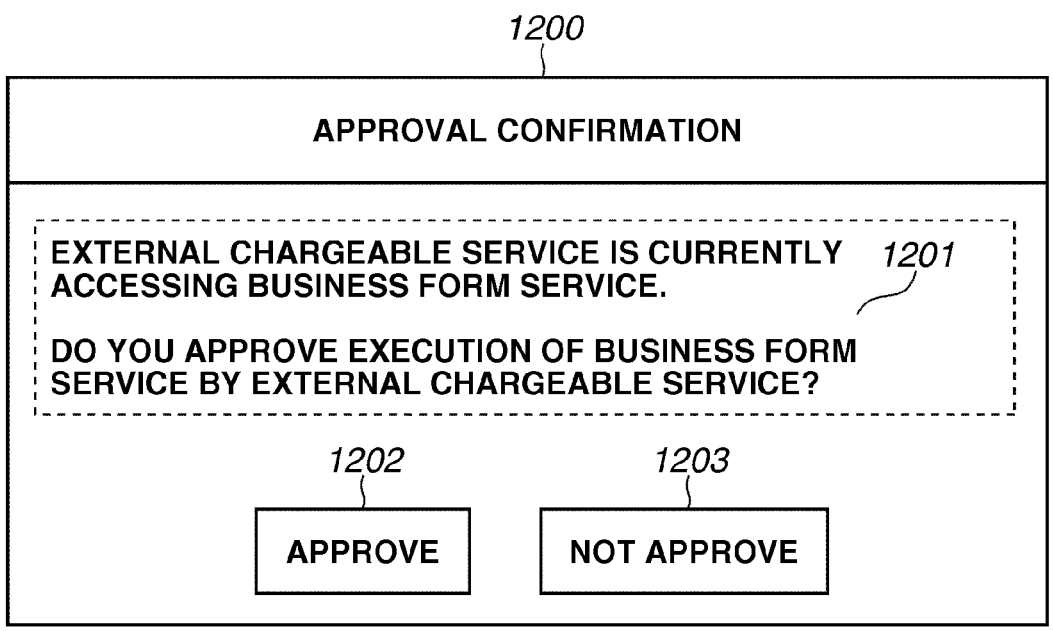
FIG. 12 illustrates an example of an approval screen.

In step S1008, the access control unit 702 generates an approval screen 1200 and transmits the generated screen to the web browser (not illustrated) installed on the client 102. FIG. 12 illustrates an example of the approval screen 1200 that can be generated by the access control unit 702 in step S1008. The approval screen illustrated in FIG. 12 is an example screen to be approval screen transmitted in step S1008. The approval screen 1200 includes an information display field 1201, an approval button 1202, and an approval cancellation button 1203.

The information display field 1201 is configured to provide the user with information relating to a service that gives an approval and an online service that can be executed by a service that is given the approval. In the present exemplary embodiment, the service that gives an approval is the external chargeable service system 103. The service that can be executed by a service that is given the approval is the business form service system 105 or the print service system 106. The approval button 1202 is a button that can be pressed by the user when the user recognizes the approval. The approval cancellation button 1203 is a button that can be pressed by the user when the user denies the approval.

If the user presses the approval button 1202 of the approval screen 1200, then in step S1009, the client 102 transmits an approval and recognition request to the access management service system 107. If the access control unit 702 receives the approval and recognition request from the client 102, then in step S1010, the access control unit 702 generates an approval code and stores the generated approval code in an approval code table 1300 managed by the approval data management unit 704.

FIG. 13 is a table illustrating a data structure that manages the approval codes generated by the access control unit 702 in step S1010. The approval code table 1300, which includes an approval code ID column 1301, a user ID column 1302, and a scope ID column 1303, is managed by the approval data management unit 704. The approval code ID column 1301 is a column that stores approval codes generated by the access control unit 702. The user ID column 1302 is a column that stores user ID of each user who has pressed the approval button 1202 of the approval screen 1200 in step S1009. The user ID value stored in the user ID column 1302, which is managed using the user table 800, is the value stored in the user ID column 801 that corresponds to the user who has pressed the approval button 1202. The scope ID column 1303 is a column that stores a scope ID value included in the approval acquisition request received by the access control unit 702 in step S1004.

In step S1010, the access control unit 702 stores the approval code in the approval code table 1300. Subsequently, the access control unit 702 transmits the approval code ID stored in the approval code ID column 1301, as a response replying to the approval and recognition request transmitted in step S1009, to the external chargeable service system 103 via the web browser of the client 102. In this case, as described in step S1003, the approval code can be sent to the external chargeable service 103 by transmitting the redirect instruction to the client 102.

If the external chargeable service system 103 receives the approval code ID from the access management service system 107, then in step S1011, the external chargeable service system 103 stores the received approval code ID in the approval code table 410. Then, the external chargeable service system 103 generates an approval token acquisition request and transmits the generated approval token acquisition request to the access management service system 107. In this case, the approval token acquisition request generated by the external chargeable service 103 includes an approval code ID, an invoker ID, and a password corresponding to the invoker ID.

In step S1012, the access management request processing unit 701 of the access management service system 107 receives the approval token acquisition request from the external chargeable service system 103 and sends the received approval token acquisition request to the access control unit 702. First, the access control unit 702 verifies the invoker ID and the password included in the approval token acquisition request. More specifically, the access control unit 702 confirms whether a combination of the invoker ID and the password included in the approval token acquisition request is already registered in the user table 800 stored in the authentication data management unit 703. If it is determined that the combination of the invoker ID and the password included in the approval token acquisition request is already registered in the user table 800 (YES in step S1012), the access control unit 702 determines that the invoker has an authority to use the service managed by the access management service system 107.

If it is determined that the combination of the user ID and the password included in the approval token acquisition request is not yet registered in the user table 800 (NO in step S1012), the access control unit 702 determines that the invoker has no authority to use the service managed by the access management service system 107. In this case, the access control unit 702 transmits an authentication error notification to the external chargeable service system 103. Then, the operation proceeds to step S1023. As described above, the invoker is an ID that is unique to the external chargeable service system 103.

If it is determined that the invoker has an authority to use the service managed by the access management service system 107, the access control unit 702 confirms whether the invoker has an authority to execute the business form generation request to be transmitted to the business form service system 105. In other words, the access control unit 702 confirms whether the invoker has an authority to use the business form service that is provided by the business form service system 105. Therefore, the authority confirmation processing is not limited to confirming the authority to execute the business form generation request described in the first exemplary embodiment.

More specifically, the access control unit 702 identifies a user ID stored in the user ID column 801 that corresponds to the invoker authenticated in step S1012. Then, the access control unit 702 acquires a role ID linked with the identified user ID with reference to the user allocation role table 920. For example, if the user ID of the user having been authenticated in step S1012 is "invoker", the role ID to be acquired by the access control unit 702 is "ServiceRole_Form."

Next, the access control unit 702 acquires a scope ID (see column 1101) that corresponds to the role ID of the invoker with reference to the scope table 1100. For example, the scope ID that corresponds to the role ID "ServiceRole_Form" of the external chargeable service system 103 (i.e., the invoker) is "Scope_FormInvoker."

Next, the access control unit 702 acquires an approval code that corresponds to the approval code ID value included in the approval token acquisition request with reference to the approval code table 1300. Then, the access control unit 702 compares the scope ID column 1303 value of the acquired approval code with the acquired scope ID of the invoker. If it is confirmed that the compared scope ID values coincide with each other, the access control unit 702 determines that the external chargeable service system 103 has the authority to execute the business form generation request to be transmitted to the business form service system 105. Then, the operation proceeds to step S1013.

Identifying that the online service that the first server system wants to use is the second online service based on the scope information linked with the received code is equivalent to the processing performed by the access control unit 702 to acquire the cope ID linked with the approval code. In this case, the access control unit 702 can be configured to refer to the scope ID linked with the approval code in recognizing that the online service that the first server system wants to use is the second online service. The access control unit 702 according to the first exemplary embodiment does not recognize any online service that the first server system wants to use.

If it is confirmed that the compared scope ID values do not coincide with each other (NO in step S1012), the access control unit 702 determines that the external chargeable service system 103 has no authority to execute the business form generation request to be transmitted to the business form service system 105. Thus, the access control unit 702 transmits a scope error notification to the external chargeable service system 103. Then, the operation proceeds to step S1023.

In step S1023, the request processing unit 301 of the external chargeable service system 103 receives the authentication error notification or the scope error notification from the access management service system 107 and sends the received error notification to the service control unit 302. The service control unit 302 generates an authentication error screen or a scope error screen (not illustrated) in response to the reception of the error notification and transmits the generated error screen to the web browser (not illustrated) installed on the client 102. The scope error screen informs the user that the external chargeable service system 103 (i.e., the first server system) has no authority to use the business form service (i.e., the second online service).

The system for delegation of authority according to the first exemplary embodiment, if it is confirmed that the user who operates the currently accessing client has no authority to use the second online service, transmits the authentication error screen that enables the user to recognize that the user has no authority to use the second online service. Then, if it is confirmed that the second online service is not included in the online services that can be used by the first service system although the user who operates the currently accessing client has the authority to use the second online service, the system for delegation of authority according to the first exemplary embodiment transmits the scope error screen that enables the user to recognize that the first service system has no authority to use the second online service.

When the above-described configuration is employed, the user can accurately recognize why the external chargeable service system 103 cannot use the business form service (i.e., the online service to be provided by the business form service system 105). For example, when the user can accurately recognize, the user can take a necessary action to use the second online service. Further, when the external chargeable service system 103 does not support the business form service system 105, the user can decide to use another external chargeable service system.

If the client 102 receives the authentication error screen or the scope error screen from the external chargeable service system 103, then in step S1025, the client 102 causes the web browser to display the received error screen. The client 102 interrupts the business form generation instruction having been instructed in step S1001. In step S1013, the access control unit 702 generates an approval token and stores the generated approval token in an approval token table 1400 that can be managed by the approval data management unit 704.

FIG. 14 is a table illustrating a data structure that manages the approval token issued by the access control unit 702 in step S1013. The approval token table 1400, which includes an approval token ID column 1401, a user ID column 1402, an invoker column 1403, and a scope ID column 1404, is managed by the approval data management unit 704. The approval token ID column 1401 is a column that stores the approval token issued by the access control unit 702. The user ID column 1402 is a column that stores user ID of the user who has pressed the approval button 1202 of the approval screen 1200 in step S1009. The user ID value stored in the user ID column 1302, which is managed using the user table 800, is the value stored in the user ID column 801 that corresponds to the user who has pressed the approval button 1202.

The invoker ID column 1403 is a column that stores the invoker ID that has the authority to execute the business form generation request to be transmitted to the business form service system 105 in step S1012. The user ID value stored in the invoker ID column 1403, which is managed using the user table 800, is the value stored in the user ID column 801 that corresponds to the external chargeable service system 103. The scope ID column 1404 is a column that stores the value of the scope ID column 1303 stored in the approval code table 1300 in step S1010.

In step S1013, the access control unit 702 stores the approval token in the approval token table 1400. Thereafter, the access control unit 702 transmits a response including the approval token ID stored in the approval token ID column 1401, as a response replying to the approval token acquisition request in step S1012, to the external chargeable service system 103. If the external chargeable service system 103 receives the approval token from the access management service system 107, then in step S1014, the external chargeable service system 103 stores the received approval token in the approval token table 420.

In step S1015, the external chargeable service system 103 transmits a business form generation request to the business form service system 105. In this case, the external chargeable service system 103 extracts the approval token from the approval token table 420. Then, the external chargeable service system 103 generates the business form generation request based on the business form data to be used in the business form generation and the data to be inserted to the business form, which are received from the client 102 in step S1003. The external chargeable service system 103 transmits the business form generation request to the business form generation service system 105 together with the extracted approval token. In this case, it is presumed that the approval token is included in the business form generation request.

In step S1016, the business form request processing unit 501 receives the business form generation request from the external chargeable service system 103 via the internet 100. The business form request processing unit 501 analyzes the approval token in the received business form generation request and sends the approval token to the business form control unit 502. The business form control unit 502 transmits an approval token verification request to the access management service system 107 via the intranet 101. In this case, the business form control unit 502 generates the token verification request with reference to the approval token received from the business form request processing unit 501 and the scope ID required to execute the business form service.

In step S1017, the access management request processing unit 701 receives the token verification request from the business form service system 105 via the intranet 101. The access management request processing unit 701 extracts and analyzes the approval token ID and the scope ID that indicates the authority to use the business form service from the received token verification request. The access management request processing unit 701 sends the approval token ID and the scope ID to the access control unit 702. Next, the access control unit 702 confirms the presence of any approval token that corresponds to the received approval token ID and the scope ID, with reference to the approval token table 1400 managed by the approval data management unit 704.

First, if the presence of the stored approval token that corresponds to the received approval token ID is confirmed, the access control unit 702 refers to the values stored in the user ID column 1402 and the scope ID column 1404. Then, the access control unit 702 confirms whether the generation of the approval token has been approved by the user who has the authority to execute the business form generation request. More specifically, the access control unit 702 compares the scope ID value included in the verification request with the value stored in the scope ID column 1404.

In this case, if it is confirmed that the scope ID value included in the verification request is stored in the scope ID column 1404, then the access control unit 702 confirms whether the user ID value stored in the user ID column 1402 is stored in the user ID column 921 of the user allocation role table 920. Next, the access control unit 702 acquires a role ID value that corresponds to the user ID value stored in the user ID column 1402 from the role ID column 922 of the user allocation role table 920. Then, the access control unit 702 confirms whether the acquired role ID value is stored in the role ID column 1102 of the scope table 1100.

Finally, the access control unit 702 compares the scope ID value stored in the scope ID column 1101, which corresponds to the corresponding role ID column 1102, with the value stored in the scope ID column 1404 of the approval token table 1400. If the compared values coincide with each other (YES in step S1017), the access control unit 702 determines that the approval token has been generated by the user. In this case, the operation proceeds to step S1018. If it is determined that the approval token has not been generated by the user (NO in step S1017), the access control unit 702 determines that the user has no authority to execute the business form generation request. Then, the access control unit 702 transmits a token error notification to the external chargeable service system 103. Then, the operation proceeds to step S1024.

In step S1018, the access control unit 702 confirms whether the approval token has been generated by the invoker who has the authority to execute the business form generation request. More specifically, the access control unit 702 compares the scope ID value included in the verification request with the value stored in the scope ID column 1404. If it is confirmed that the scope ID value included in the verification request is stored in the scope ID column 1404, then the access control unit 702 confirms whether the user ID value stored in the invoker ID column 1403 is stored in the user ID column 921 of the user allocation role table 920. Next, the access control unit 702 acquires a role ID value that corresponds to the user ID value stored in the invoker ID column 1403 from the role ID column 922 of the user allocation role table 920. Then, the access control unit 702 confirms whether the acquired role ID is stored in the role ID column 1102 of the scope table 1100.

Finally, the access control unit 702 compares the scope ID value stored in the scope ID column 1101, which corresponds to the corresponding role ID column 1102, with the value stored in the scope ID column 1404 of the approval token table 1400. If the compared values coincide with each other (YES in step S1018), the access control unit 702 determines that the approval token has been generated by the invoker. In this case, the access control unit 702 transmits a response including the determination result to the business form service system 105. Then, the operation proceeds to step S1019. If it is determined that the approval token has not been generated by the invoker (NO in step S1018), the access control unit 702 determines that the invoker has no authority to execute the business form generation request. Then, the access control unit 702 transmits a token error notification to the external chargeable service system 103. Then, the operation proceeds to step S1024.

In step S1024, the request processing unit 301 of the external chargeable service system 103 receives the token error notification from the access management service system 107 via the internet 100 and sends the received token error notification to the service control unit 302. The service control unit 302 generates a token error screen (not illustrated) in response to reception of the token error notification and transmits the generated screen to the web browser (not illustrated) installed on the client 102. If the client 102 receives the token error screen from the external chargeable service system 103, then in step S1025, the client 102 causes the web browser to display the received screen and interrupts the business form generation instruction having been instructed in step S1001.

In step S1019, the business form request processing unit 501 receives a response replying to the token verification request from the access management service system 107. Then, the business form request processing unit 501 analyzes the business form data to be used in the business form generation and the data to be inserted to the business form, with reference to the received business form generation request, and sends the analyzed data to the business form control unit 502. The business form control unit 502 sends the received business form data and the data to be inserted to the business form to the business form data processing unit 503. The business form data processing unit 503 performs business form generation processing based on the received data.

If the business form generation processing has been completed, the business form control unit 502 stores an execution result including the generated business form data in the business form data management unit 504. Then, the business form control unit 502 transmits the generated business form data, as a response replying to the business form generation request, to the external chargeable service system 103. As described above, the external chargeable service system 103 (i.e., the first server system) can use the business form service to be provided by the business form service system 105 (i.e., the second online service) by using the issued access token. Then, the external chargeable service and the business form service can cooperate with each other to realize a mashup service. In general, the mashup service is a service that can be realized by causing two or more services to cooperate with each other.

In step S1020, the external chargeable service system 103 receives the business form data from the business form service system 105 and transmits the received business form data to the web browser (not illustrated) installed on the client 102. If the client 102 receives the business form data from the external chargeable service system 103, then in step S1021, the client 102 causes the web browser to display the received business form data. Through the above-described processing, the client 102 can normally complete the business form generation instruction having been issued to the external chargeable service system 103 in step S1001.

As described above, in the first exemplary embodiment, a server itself that provides a cooperation source service is cooperatively operable with a service that is required to have any appropriate authority to access a cooperation destination service. Further, in the first exemplary embodiment, confirming whether each of the user and the cooperation source service has an appropriate authority to access the cooperation destination service before executing the service is attainable.

In the online service cooperation according to the first exemplary embodiment, the external chargeable service system 103 executes a single online service system (more specifically, the business form service system 105). In a second exemplary embodiment, the external chargeable service system 103 is cooperatively operable with a plurality of online service systems (e.g., on-line services that can be provided by the business form service system 105 and the print service system 106), as described below with reference to a sequence diagram illustrated in FIG. 15.

FIG. 15 is a sequence diagram illustrating sequential processing in which a user uses the business form generation and print service via the external chargeable service system 103 and prints business form data converted based on the data stored in the external chargeable service system 103. A system configuration according to the second exemplary embodiment is similar to that described in the first exemplary embodiment, unless it is specifically mentioned.

In the present exemplary embodiment, the user is required to complete the registration of authentication information in all of the external chargeable service system 103, the business form service system 105, and the print service system 106 before the user uses the business form generation and print service via the external chargeable service system 103. Further, in the business form generation and print service the service system that actually transmits a business form print request to the business form service system 105 is the external chargeable service system 103.

Therefore, the external chargeable service system 103 is required to have an authority to use the business form service system 105 and the print service system 106. Further, in a mashup operation, it is required that the business form service system 105 and the print service system 106 can be used within the authority range of the user who operates the external chargeable service system 103. Similarly, it is required that the business form service system 105 and the print service system 106 can be used within the authority range of the external chargeable service system 103.

In step S1501, a user operates the client 102 to transmit a request of a business form generation and print instruction to the external chargeable service system 103. In this case, the external chargeable service system 103 generates screen information (not illustrated) that enables the user to select business form data that is required to generate a business form and data to be inserted to the business form. The external chargeable service system 103 causes a web browser (not illustrated) installed on the client 102 to display the generated screen. In generating the request of the business form generation and print instruction, the user selects business form data to be used in the business form generation, data to be inserted to the business form, and printer to be used in printing from the screen information displayed by the web browser.

In step S1502, the request processing unit 301 receives the request of the business form generation and print instruction transmitted from the client 102. The request processing unit 301 analyzes the business form data to be used in the business form generation, the data to be inserted to the business form, and information relating to the printer to be used in the printing with reference to the received request of the business form generation and print instruction. The request processing unit 301 sends the analyzed data to the service control unit 302. The service control unit 302 requests the token management unit 305 to confirm whether an approval token required to use the online service that can be provided by the business form service system 105 or the print service system 106 is stored in the approval token ID column 422 of the token table 420.

If it is determined that the approval token is stored in the approval token ID column 422 (YES in step S1502), the operation proceeds to step S1515. The external chargeable service system 103 transmits a business form generation and print request to the business form service system 105. If it is determined that the approval token is not stored in the approval token ID column 422 (NO in step S1502), the operation proceeds to step S1503. The external chargeable service system 103 generates an approval acquisition request to be sent to the business form service system 105 and the print service system 106 and transmits the generated approval acquisition request to the access management service system 107.

In this case, the external chargeable service system 103 generates the approval acquisition request with reference to the service cooperation table 400, which stores the API column 402 value and the scope ID column 403 value that correspond to the business form service system 105 and the print service system 106.

In this case, the reason why the approval acquisition request includes the scope ID is because it is necessary to verify whether the user has an authority to approve the execution of the business form service system 105. The access management service system 107 refers to the scope table 1100 and the user allocation role table 920 to verify whether the user has the authority to approve the external chargeable service system 103 to execute the business form service system 105. More specifically, the approval acquisition request transmitted from the external cooperation service 103 to the access management service system 107 in step S1503 includes "Scope_FormUser", "Scope_FormInvoker", "Scope_PrintUser", and "Scope_PrintInvoker" values as the scope ID.

Figure 10B:
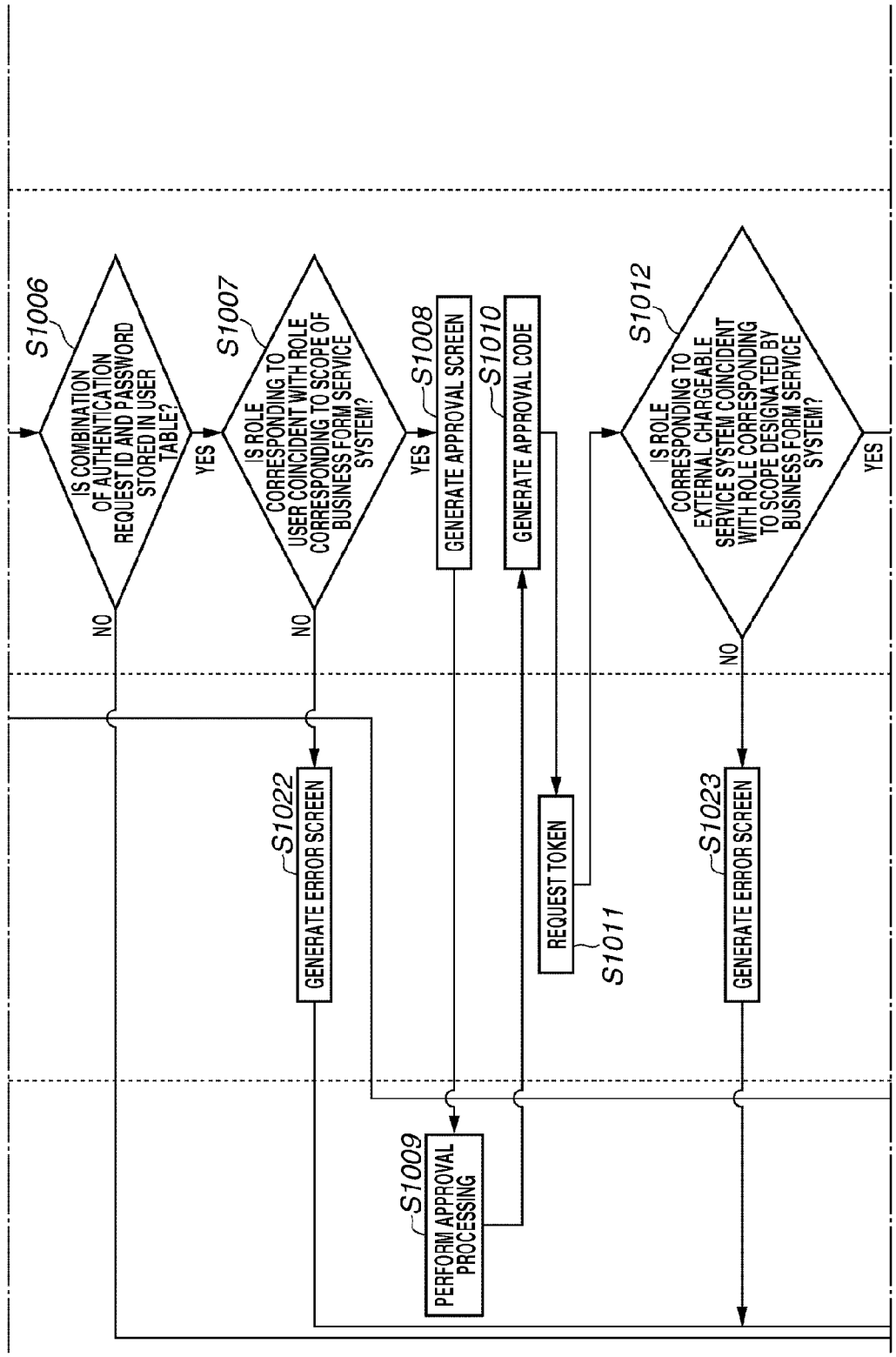

Processing to be performed in step S1504 and step S1505 is similar to the processing performed in step S1004 and step S1005 illustrated in FIG. 10 and therefore the description thereof is not repeated. In step S1506, the access management request processing unit 701 receives the authentication request from the client 102, and sends the received authentication request to the access control unit 702. The access control unit 702 verifies the user ID and the password included in the authentication request. More specifically, the access control unit 702 confirms whether a combination of the user ID and the password included in the authentication request is already registered in the user table 800 stored in the authentication data management unit 703.

If it is determined that the combination of the user ID and the password included in the authentication request is already registered in the user table 800 (YES in S1506), the access control unit 702 determines that the user who is currently operating the client 102 is one of the users managed by the access management service system 107. Then, the operation proceeds to step S1507. If it is determined that the combination of the user ID and the password included in the authentication request is not yet registered in the user table 800 (NO in S1506), the access control unit 702 determines that the user who is currently operating the client 102 is not any one of the users managed by the access management service system 107. The access control unit 702 generates an authentication error screen (not illustrated) and transmits the generated authentication error screen to the web browser (not illustrated) installed on the client 102.

In step S1507, the access control unit 702 confirms whether the user having been authenticated in step S1506 has an authority to receive a service to be provided by a cooperation destination service system of the external chargeable service system 103. More specifically, the access control unit 702 acquires a role ID linked with the user ID stored in the user ID column 801, which corresponds to the user having been authenticated in step S1506, with reference to the user allocation role table 920. For example, if the user ID of the user having been authenticated in step S1506 is "User1", the access control unit 702 acquires "UserRole_Form" as role ID of the business form service system 105 and acquires "UserRole_Print" as role ID of the print service system 106.

Next, the access control unit 702 acquires each role ID linked with the scope ID included in the approval acquisition request having been received in step S1504, with reference to the scope table 1100. For example, according to the scope table 1100, "Scope_FormUser" and "Scope_FormInvoker" are scope ID values that correspond to the business form service system 105, which are included in the approval acquisition request. Further, according to the scope table 1100, "Scope_PrintUser" and "Scope_PrintInvoker" are scope ID values that correspond to the print service system 106. Therefore, in the present exemplary embodiment, the access control unit 702 acquires a total of four role IDs, i.e., "UserRole_Form" and "ServiceRole_Form" as role IDs that correspond to the business form service system 105 and "UserRole_Print" and "ServiceRole_Print" as role IDs that correspond to the print service system 106.

Finally, the access control unit 702 compares the role ID having been acquired with reference to the user allocation role table 920 with the role ID having been acquired with reference to the scope table 1100. Then, if it is determined that the compared role IDs coincide with each other (YES in step S1507), the access control unit 702 determines that the user of the business form service system 105 having been authenticated in step S1506 has the authority to receive a service to be provided by the cooperation destination service system of the external chargeable service system 103. Then, the operation proceeds to step S1508.

For example, the role ID "UserRole_Form" linked with the user ID "User1" coincides with the role ID "UserRole_Form" linked with the scope ID "Scope_FormUser." Therefore, the access control unit 702 determines that the user having the user ID "User1" has an authority to use the business form service of the business form service system 105. In addition, the role ID "UserRole_Print" linked with the user ID "User1" coincides with the role ID "UserRole_Print" linked with the scope ID "Scope_PrintUser." Therefore, the access control unit 702 determines that the user having the user ID "User1" has an authority to use the print service of the print service system 106.

The access control unit 702 compares the role ID having been acquired with reference to the user allocation role table 920 with the role ID having been acquired with reference to the scope table 1100. If the compared role IDs do not coincide with each other (NO in step S1507), the access control unit 702 determines that the user having been authenticated in step S1506 has no authority to receive a service to be provided by the cooperation destination service system of the external chargeable service system 103. Then, the access control unit 702 transmits a scope error redirect request to the external chargeable service system 103 via the web browser of the client 102. Then, the operation proceeds to step S1527.

In step S1527, the request processing unit 301 receives the scope error redirect request from the access management service system 107. The request processing unit 301 sends scope error information to the service control unit 302. The service control unit 302 generates a scope error screen (not illustrated) in response to reception of the scope error redirect request and transmits the generated scope error screen to the web browser (not illustrated) installed on the client 102. The scope error screen generated in this case is similar to the screen having been described in the first exemplary embodiment.

However, the following screen is usable because the external chargeable service system 103 cooperates with two services in the second exemplary embodiment. More specifically, in a case where the user has no authority to use one of two services, the scope error screen can be configured to let the user recognize that the user has no authority to use the service. Further, the scope error screen can be configured to let the user recognize a service that the user has an authority to use. When the above-described scope error screen is displayed, the user can easily recognize the processing that is necessary to instruct the business form print request from the external chargeable service 103.

In step S1530, the client 102 receives the scope error screen from the external chargeable service system 103 and causes the web browser to display the scope error screen. Then, the client 102 interrupts the business form generation and print instruction having been instructed in step S1501. Processing to be performed in step S1508, step S1509, and step S1510 is similar to the processing performed in step S1008, step S1009, and step S1010 illustrated in FIG. 10. Therefore, the description thereof is not repeated.

If the external chargeable service system 103 receives the approval code ID from the access management service system 107, then in step S1511, the external chargeable service system 103 stores the received approval code ID in the approval code table 410. Then, the external chargeable service system 103 generates an approval token acquisition request and transmits the generated approval token acquisition request to the access management service system 107. In this case, the approval token acquisition request generated by the external chargeable service 103 includes an approval code ID, an invoker ID, and a password corresponding to the invoker ID for each of the business form service system 105 and the print service system 106.

In step S1512, the access management request processing unit 701 receives the approval token acquisition request from the external chargeable service system 103 and transmits the received approval token acquisition request to the access control unit 702. The access control unit 702 verifies the invoker ID and the password included in the approval token acquisition request. More specifically, the access control unit 702 confirms whether a combination of the invoker ID and the password included in the approval token acquisition request is already registered in the user table 800 stored in the authentication data management unit 703.

If it is determined that the combination of the invoker ID and the password included in the approval token acquisition request is already registered in the user table 800 (YES in step S1512), the access control unit 702 determines that the invoker can use the service managed by the access management service system 107. If it is determined that the combination of the invoker ID and the password included in the approval token acquisition request is not yet registered in the user table 800 (NO in step S1512), the access control unit 702 determines that the invoker cannot use the service managed by the access management service system 107. In this case, the access control unit 702 transmits an authentication error notification to the external chargeable service system 103. Then, the operation proceeds to step S1528.

If it is determined that the invoker can use the service managed by the access management service system 107, the access control unit 702 confirms whether the invoker has an authority to execute the business form generation request to be transmitted to the business form service system 105. More specifically, the access control unit 702 confirms whether the user ID of the user having been authenticated in step S1512 is stored in the user ID column 801, and acquires a role ID linked with the identified user ID with reference to the user allocation role table 920.

More specifically, in a case where the user ID of the user having been authenticated in step S1512 is "invoker", role IDs to be acquired by the access control unit 702 are "ServiceRole_Form" and "ServiceRole_Print." Next, the access control unit 702 acquires the scope ID 1101 that corresponds to the role ID of the invoker with reference to the scope table 1100. For example, the scope ID that corresponds to the role ID "ServiceRole_Form" of the external chargeable service system 103 (i.e., the invoker) is "Scope_FormInvoker", and the scope ID that corresponds to the role ID "ServiceRole_Print" is "Scope_PrintInvoker."

Next, the access control unit 702 acquires scope information that corresponds to the approval code included in the approval token acquisition request with reference to the approval code table 1300. Then, the access control unit 702 compares the acquired scope information that corresponds to the approval code with the acquired scope information that corresponds to the invoker. Then, if it is confirmed that the compared scope information coincide with each other (YES in step S1512), the access control unit 702 determines that the external chargeable service system 103 has an authority to execute the business form generation and print request. Then, the operation proceeds to step S1513. In other words, the access control unit 702 determines that the external chargeable service 103 has an authority to use the online services to be provided by the business form service system 105 and the print service system 106.

If it is confirmed that the compared scope ID values do not coincide with each other (NO in step S1512), the access control unit 702 determines that the external chargeable service system 103 does not have any authority to execute the business form generation and print request. The access control unit 702 transmits a scope error notification to the external chargeable service system 103. Then, the operation proceeds to step S1528. In step S1528, the request processing unit 301 receives the authentication error notification or the scope error notification from the access management service system 107 and sends the received error notification to the service control unit 302. In response to the reception of the error notification, the service control unit 302 generates an authentication error screen or a scope error screen (not illustrated) corresponding to the error and transmits the generated error screen to the web browser (not illustrated) installed on the client 102.

The scope error screen to be transmitted by the service control unit 302 is different from the scope error screen of the user in that it is unnecessary to let the user recognize each online service that cannot be used by the user. In this case, displaying a simple message informing the infeasibility of processing, such as "the external chargeable service system 103 cannot cooperate with a cooperation destination service system", on the screen is desired. The reason why the simple display is desirable is because the user cannot set any authority to cause the external chargeable service system 103 to use the cooperation destination online service.

The user is a mere client who uses the external chargeable service system 103 and is not an administrator who manages the external chargeable service system 103. It will not be necessary for such a user to check each online service that cannot be used by the external chargeable service system 103. All things necessary for the user is checking whether an intended cooperation destination online service is usable via the external chargeable service system 103. If the intended service is unavailable, the user will try to use another external chargeable service system. As described above, changing the display method is meaningful even when the same scope error screen is used.

In step S1530, the client 102 receives the authentication error screen or the scope error screen from the external chargeable service system 103 and causes the web browser to display the received error screen. Then, the client 102 interrupts the business form generation and print instruction having been instructed in step S1501. Processing to be performed in step S1513 and step S1514 is similar to the processing performed in step S1013 and step S1014 illustrated in FIG. 10. Therefore, the description thereof is not repeated.

In step S1515, the external chargeable service system 103 transmits the business form generation and print request to the business form service system 105. In this case, the external chargeable service system 103 generates the business form generation and print request based on the approval token ID stored in the approval token table 420 and the data/information having been received from the client 102 in step S1003 (i.e., the business form data to be used in the business form generation, the data to be inserted to the business form, and the information relating to the printer to be used in the printing).

In step S1516, the business form request processing unit 501 receives the business form generation and print request from the external chargeable service system 103. The business form request processing unit 501 extracts the approval token from the received business form generation request and sends the extracted approval token to the business form control unit 502. The business form control unit 502 transmits a token verification request to the access management service system 107. In this case, the business form control unit 502 generates the approval token verification request based on the approval token received from the business form request processing unit 501.

Processing to be performed in steps S1517 and S1518 is similar to the processing performed in steps S1017 and S1018 illustrated in FIG. 10. Therefore, the description thereof is not repeated. If it is determined that the approval token has been generated by the user and the invoker whose authority range is appropriate (YES in step S1518), the access control unit 702 transmits a response including the determination result to the business form service system 105. Then, the operation proceeds to step S1519.

If it is determined that the approval token has not been generated by the user and the invoker whose authority range is appropriate (NO in step S1518), the access control unit 702 determines that each of the user and the invoker has no authority to execute the business form generation request. Then, the access control unit 702 transmits a token error notification to the external chargeable service system 103. Then, the operation proceeds to step S1529.

In step S1519, the business form request processing unit 501 receives a response replying to the token verification request from the access management service system 107. Then, the business form request processing unit 501 analyzes the business form data to be used in the business form generation and the data to be inserted to the business form, with reference to the received business form generation and print request, and sends the analyzed data to the business form control unit 502. The business form control unit 502 sends the received business form data and the data to be inserted to the business form to the business form data processing unit 503. The business form data processing unit 503 performs business form generation processing based on the received data. If the business form generation processing has been completed, the business form control unit 502 stores an execution result including the generated business form data in the business form data management unit 504.

In step S1520, the business form service system 105 transmits a business form print request to the print service system 106. In this case, the business form service system 105 generates the business form print request based on the approval token ID stored in the approval token table 420 as well as based on the business form data having been generated in step S1518 and stored in the business form data management unit 504, and the information relating to the printer to be used in the printing, included in the business form generation and print request received in step S1516.

In step S1521, the print request processing unit 601 receives the business form print request from the business form service system 105. The print request processing unit 601 extracts the approval token from the received business form print request and sends the extracted approval token to the print control unit 602. The print control unit 602 transmits a token verification request to the access management service system 107. In this case, the print control unit 602 generates the token verification request based on the approval token ID received from the print request processing unit 601. In step S1522, the access management request processing unit 701 receives the token verification request from the print service system 106. The access management request processing unit 701 extracts the approval token ID and the scope ID from the received token verification request, and sends the extracted approval token ID and the scope ID to the access control unit 702.

Next, the access control unit 702 confirms the presence of any approval token that corresponds to the received approval token ID and the scope ID with reference to the approval token table 1400 managed by the approval data management unit 704. First, in a case where the approval token that corresponds to the received approval token ID is stored, the access control unit 702 confirms whether the approval token has been generated by the user who has an authority to execute the business form print request with reference to the values stored in the user ID column 1402 and the scope ID column 1404.

More specifically, the access control unit 702 compares the scope ID value included in the verification request with the value stored in the scope ID column 1404. In this case, if it is confirmed that the scope ID value included in the verification request is stored in the scope ID column 1404, then the access control unit 702 confirms whether the user ID value stored in the user ID column 1402 is stored in the user ID column 921 of the user allocation role table 920.

Next, the access control unit 702 acquires a role ID that corresponds to the user ID value stored in the user ID column 1402 from the role ID column 922 of the user allocation role table 920. Then, the access control unit 702 acquires a scope ID from the scope table 1100. Finally, the access control unit 702 compares scope information of the column 1101 that corresponds to the role ID column 1102 with scope information in the scope ID column 1404 of the approval token table 1400.

If the compared scope information coincide with each other (YES in step S1522), the access control unit 702 determines that the approval token has been generated by the user. Then, the operation proceeds to step S1523. If it is determined that the approval token has not been generated by the user, the access control unit 702 determines that the user has no authority to execute the business form print request. Then, the access control unit 702 transmits a token error notification to the external chargeable service system 103. Then, the operation proceeds to step S1529.

In step S1523, the access control unit 702 confirms whether the approval token has been generated by the invoker who has the authority to execute the business form print request. The confirmation method in this step is similar to the method having been described in step S1522, and is verification of the invoker (see step S1518). If it is determined that the approval token has not been generated by the invoker (NO in step S1523), the access control unit 702 determines that the invoker has no authority to execute the business form generation request. Then, the access control unit 702 transmits a token error notification to the external chargeable service system 103. Then, the operation proceeds to step S1529.

In step S1529, the request processing unit 301 receives the token error notification from the access management service system 107 and sends the received token error notification to the service control unit 302. If the service control unit 302 receives the token error notification, the service control unit 302 generates a scope error screen (not illustrated) and transmits the generated scope error screen to the web browser (not illustrated) installed on the client 102. In step S1530, if the client 102 receives the scope error screen from the external chargeable service system 103, the client 102 causes the web browser to display the scope error screen and interrupts the business form generation and print instruction having been instructed in step S1501. The scope error screen has the above-described contends.

In step S1524, the print request processing unit 601 receives a response replying to the token verification request from the access management service system 107. Then, the print request processing unit 601 extracts the business form data and the information relating to the printer to be used in the printing from the received business form print request, and sends the extracted data to the business form control unit 602. The print control unit 602 sends the received print data to the print data conversion unit 603 and requests the print data conversion unit 603 to perform print data generation processing. If the print data generation processing is completed, the print control unit 602 stores the generated print data, as an execution result, in the print data management unit 604. Then, the print control unit 602 transmits the generated print data and the information relating to the printer to be used in the printing, as a response replying to the business form generation and print request, to the external chargeable service system 103.

In step S1525, the external chargeable service system 103 receives the print data from the print service system 106 and transmits the received print data to the web browser (not illustrated) installed on the client 102. In step S1526, if the client 102 receives the print data and the information relating to the printer to be used in the printing from the external chargeable service system 103, the client 102 transmits the print data to the printer 109 that corresponds to the received printer information. The printer 109 performs print processing based on the received print data.

Through the above-described processing, the client 102 normally completes the business form generation and print instruction having been transmitted to the external chargeable service system 103 in step S1501. The method for transmitting the print data to the printer via the client is not limited to the above-described processing. For example, it is useful to transmit a file path of the URL of the print data stored in the external chargeable service system 103 to the printer via the client. In this case, the printer can acquire the print data based on the URL.

As described above, in the second exemplary embodiment, the external chargeable service system 103 cooperates with a plurality of on-line service systems (i.e., on-line services that can be provided by the business form service system 105 and the print service system 106). In addition to the effects described in the first exemplary embodiment, the following effects can be also obtained in the second exemplary embodiment. It is presumed that a printer that is currently used by a user is managed by the external chargeable service system 103 and is not managed by the business form service system 105 and the print service system 106. According to the second exemplary embodiment, even in such a case, a plurality of online services can cooperate with each other within an appropriate authority range. Therefore, the printer can perform an online print with some value added under a higher security policy.

In each of the above-described exemplary embodiments, the process of confirming user's authority to use an online service of a cooperation destination precedes the process of confirming invoker's authority to use the online service of the cooperation destination. However, the processing order is not limited to the above-described example. For example, it is useful to confirm whether the external chargeable service 103 can use an online service to be provided by a cooperation destination service system before the user uses an online service of the external chargeable service 103.

In this case, the external chargeable service 103 transmits invoker's scope information to the access management service system 107 and obtains an authority confirmation result. If it is confirmed based on the authority confirmation result that the external chargeable service 103 can use the online service to be provided by the cooperation destination service system, the user is allowed to execute the usage of the online service.

However, if it is confirmed that the external chargeable service 103 cannot use the online service, it is useful to generate a warning before the user uses the online service. According to this arrangement, the user can recognize that the external chargeable service 103 cannot cooperate with the cooperation destination online service before the user uses the online service. In other words, it is feasible to eliminate any useless utilization of the online service.

OTHER EMBODIMENTS

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-006205 filed Jan. 16, 2012, which is hereby incorporated by reference herein in its entirety.

What is claimed is:

1. A system for delegation of authority, comprising: a first service system configured to provide a first online service;
a second service system configured to provide a second online service and configured to communicate with the first service system;
an access management service system configured to manage authentication information and approval tokens that are required to use a plurality of service systems including the second service system; and
wherein the system for delegation of authority is configured to receive information from a client configured to be operated by a user who has registered authentication information required to use online services that are provided by the first service system and the second service system,
wherein the first service system includes a first redirect instruction unit configured to transmit scope information to the client to identify the second online service, if it is necessary to use the second online service provided by the second service system in a process of responding to a processing request from the client operated by the user, and configured to transmit a message causing the client to access the access management service system,
wherein the access management service system includes an approval screen transmission unit configured to confirm whether the user has an authority to use the second online service and, if it is confirmed that the user has the authority, configured to transmit an approval screen to the client to enable the user to confirm whether to approve that the first service system uses the second online service;
the access management service system further includes a management unit configured to issue a code required to issue an approval token if it is confirmed that the user has approved via the approval screen, and manage the issued code in such a way as to be linked with the scope information acquired when accessed by the client;
the access management service system further includes a second redirect instruction unit configured to transmit the code to the client causing the client to access the first service system;
the first service system further includes a transmission unit configured to transmit authentication information that is unique to the first service system and the code acquired when accessed by the client to the access management service system;
the access management service system further includes a confirmation unit configured to identify an online service that the first service system wants to use based on the scope information linked with the received code, and confirm whether the identified online service is included in online services that can be used by the first service system based on the received authentication information that is unique to the first service system; and
the access management service system further includes an issuance unit configured to issue an approval token if it is confirmed that the identified online service is included in the online services that can be used by the first service system,
wherein the first service system can use the second online service with the issued approval token,
wherein the first service system is configured to transmit another scope information to identify whether the user has an authority to approve that the first service system uses the second online service in addition to the scope information required to identify the second online service that the first service system wants to use, which has been transmitted to the client from the first service system, and when the access management service system confirms whether the user operating the currently accessing client has the authority to use the second online service, the access management service system is configured to confirm an authority to use an online service linked with the received another scope information and confirm the authority to use the online service allocated to the user, which can be identified based on the authentication information having been input by the user, and if it is confirmed that the authority to use the online service linked with the received another scope information is allocated to the user, the access management service system is configured to determine that the user operating the currently accessing client has the authority to use the second online service.

2. The system for delegation of authority according to claim 1, wherein the access management service system is configured to control the issuance unit to issue no approval token if it is confirmed that a user who operates a currently accessing client has no authority to use the second online service, or if it is confirmed that the identified online service is not included in the online services that can be used by the first service system although it is confirmed that the user operating the currently accessing client has an authority to use the second online service.

3. The system for delegation of authority according to claim 1, wherein if it is confirmed that a user who operates a currently accessing client has no authority to use the second online service, the access management service system is configured to transmit an authentication error screen to the client to enable the user to recognize that the user has no authority to use the second online service, and if it is confirmed that the identified online service is not included in the online services that can be used by the first service system although it is confirmed that the user operating the currently accessing client has an authority to use the second online service, the first service system is configured to transmit a scope error screen to enable the user to recognize that the user has no authority to use the second online service.

4. An access management service system for a system for delegation of authority, wherein the system for delegation of authority comprises:

a first service system configured to provide a first online service;

a second service system configured to provide a second online service and configured to communicate with the first service system;

an access management service system configured to manage authentication information that is required to use the second service system; and wherein the system for delegation of authority is configured to receive information from a client configured to be operated by a user who has registered authentication information required to use an online service that can be provided by the second service system, the access management service system comprising:

a confirmation unit configured to receive the authentication information of the user and confirm whether the user can use the second online service based on the received authentication information of the user, and further configured to receive authentication information that is unique to the first service system and confirm whether the first service system can use the second online service based on the received authentication information that is unique to the first service system; and an issuance unit configured to issue an approval token if it is confirmed that the user can use the second online service and if it is confirmed that the first service system can use the second online service, wherein the first service system uses the issued approval token to use the second online service if it is necessary to use the second online service provided by the second service system in a process of responding to a processing request from the client operated by the user, wherein the first service system is configured to transmit another scope information to identify whether the user has an authority to approve that the first service system uses the second online service in addition to a scope information required to identify the second online service that the first service system wants to use, which has been transmitted to the client from the first service system, and when the access management service system confirms whether the user operating the currently accessing client has the authority to use the second online service, the access management service system is configured to confirm an authority to use an online service linked with the received another scope information and confirm the authority to use the online service allocated to the user, which can be identified based on the authentication information having been input by the user, and if it is confirmed that the authority to use the online service linked with the received another scope information is allocated to the user, the access management service system is configured to determine that the user operating the currently accessing client has the authority to use the second online service.

5. A control method for a system for delegation of authority, the system comprising:

a first service system configured to provide a first online service;

a second service system configured to provide a second online service and configured to communicate with the first service system;

an access management service system configured to manage authentication information and approval token that are required to use a plurality of service systems including the second service system; and wherein the system for delegation of authority is configured to receive information from a client configured to be operated by a user who has registered authentication information required to use online services that can be provided by the first service system and the second service system, wherein a first redirect instruction unit of the first service system transmits scope information to the client to identify the second online service, if it is necessary to use the second online service provided by the second service system in a process of responding to a processing request from the client operated by the user, and transmitting a message causing the client to access the access management service system;

an approval screen transmission unit of the access management service system confirms whether the user has an authority to use the second online service and, if it is confirmed that the user has the authority, transmits an approval screen to the client to enable the user to confirm whether to approve that the first service system uses the second online service;

a management unit of the access management service system issues a code required to issue an approval token if it is confirmed that the user has approved via the approval screen, and manages the issued code in such a way as to be linked with the scope information acquired when accessed by the client;

a second redirect instruction unit of the access management service system transmits the code to the client causing the client to access the first service system;

a transmission unit of the first service system transmits authentication information that is unique to the first service system and the code acquired when accessed by the client to the access management service system;

a confirmation unit of the access management service system identifies an online service that the first service system wants to use based on the scope information linked with the received code, and confirms whether the identified online service is included in online services that can be used by the first service system based on the received authentication information that is unique to the first service system; and an issuance unit of the access management service system issues an approval token if it is confirmed that the identified online service is included in the online services that can be used by the first service system, wherein the approval token issued by the first service system is usable to use the second online service and to realize a mashup service that causes the first online service and the second online service to cooperate with each other, wherein the first service system is configured to transmit another scope information to identify whether the user has an authority to approve that the first service system uses the second online service in addition to the scope information required to identify the second online service that the first service system wants to use, which has been transmitted to the client from the first service system, and when the access management service system confirms whether the user operating the currently accessing client has the authority to use the second online service, the access management service system is configured to confirm an authority to use an online service linked with the received another scope information and confirm the authority to use the online service allocated to the user, which can be identified based on the authentication information having been input by the user, and if it is confirmed that the authority to use the online service linked with the received another scope information is allocated to the user, the access management service system is configured to determine that the user operating the currently accessing client has the authority to use the second online service.

6. A non-transitory computer readable medium encoded with instructions for an access management service comprising instructions for:

the access management service transmitting a first approval token to a first online service, the first approval token is associated with a particular user and a plurality of particular privileges accorded the particular user with a second online service;

the access management service receiving a verification request of the first approval token from the second online service;

the access management service verifying that the first approval token is associated with the plurality of particular privileges accorded the particular user with the second online service; and the access management service transmitting a message to the second online service if the access management service positively affirms that the first approval token is associated with the plurality of particular privileges accorded the particular user with the second online service, wherein a first service system is configured to transmit another scope information to identify whether the particular user has an authority to approve that the first service system uses the second online service in addition to a scope information required to identify the second online service that the first service system wants to use, which has been transmitted to the client from the first service system, and when the access management service system confirms whether the user operating the currently accessing client has the authority to use the second online service, the access management service system is configured to confirm an authority to use an online service linked with the received another scope information and confirm the authority to use the online service allocated to the user, which can be identified based on the authentication information having been input by the user, and if it is confirmed that the authority to use the online service linked with the received another scope information is allocated to the user, the access management service system is configured to determine that the user operating the currently accessing client has the authority to use the second online service.

7. The non-transitory computer readable medium of claim 6 further comprising instructions for:

the access management service transmitting a message to the first online service if the access management service determines that the first approval token is not associated with the plurality of particular privileges accorded the particular user with the second online service.

8. The non-transitory computer readable medium of claim 6 further comprising instructions for:

the access management service transmitting a message to a client of the particular user if the access management service determines that the first approval token is not associated with the plurality of particular privileges accorded the particular user with the second online service.

9. A non-transitory computer readable medium encoded with instructions for an access management service comprising instructions for:

the access management service transmitting a first approval token to a first online service, the first approval token is associated with a particular user and a plurality of particular privileges accorded the particular user with a second online service;

the access management service receiving a verification request of the first approval token from the second online service;

the access management service verifying that the first approval token is associated with the plurality of particular privileges accorded the particular user with the second online service; and the access management service transmitting a message to the second online service if the access management service positively affirms that the first approval token is associated with the plurality of particular privileges accorded the particular user with the second online service, wherein the access management service transmits the first approval token after:

the access management service receiving an authentication request from the first service;

the access management service transmitting the authentication request to a client of the particular user;

the access management service receiving authentication information from the client;

the access management service verifying the authentication information against information stored by the access management service about the particular user;

the access management service transmitting a request to the client of the particular user for approval of the first service to have access to the plurality of particular privileges accorded the particular user with the second online service;

the access management service receiving approval information from the client;

wherein the access management service transmits the first approval token to first online service after receiving approval information from the client.

* * * * *